(12) United States Patent
Lee et al.

(10) Patent No.: US 11,546,124 B2
(45) Date of Patent: Jan. 3, 2023

(54) METHOD AND APPARATUS FOR COMMUNICATION USING FRONTHAUL INTERFACE

(71) Applicant: ELECTRONICS AND TELECOMMUNICATIONS RESEARCH INSTITUTE, Daejeon (KR)

(72) Inventors: Jae Seung Lee, Daejeon (KR); Moon Sik Lee, Daejeon (KR); Jae Woo Park, Daejeon (KR); Jee Yon Choi, Daejeon (KR); Young Hoon Kim, Daejeon (KR); Ju Ho Park, Daejeon (KR); Hoo Sung Lee, Sejong-si (KR); Young Il Jeon, Daejeon (KR); Chan Bok Jeong, Daejeon (KR); Hyung Sik Ju, Hwaseong-si (KR); Ik Jae Chun, Daejeon (KR); Il Gyu Kim, Chungcheongbuk-do (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 157 days.

(21) Appl. No.: 17/064,994

(22) Filed: Oct. 7, 2020

(65) Prior Publication Data

US 2021/0126760 A1  Apr. 29, 2021

(30) Foreign Application Priority Data

Oct. 11, 2019 (KR) .................... 10-2019-0126364
Sep. 29, 2020 (KR) .................... 10-2020-0127256

(51) Int. Cl.
H04W 72/04 (2009.01)
H04W 88/08 (2009.01)
H04L 5/00 (2006.01)

(52) U.S. Cl.
CPC .......... *H04L 5/0092* (2013.01); *H04L 5/0005* (2013.01); *H04W 72/0406* (2013.01); *H04W 88/085* (2013.01)

(58) Field of Classification Search
None
See application file for complete search history.

(56) References Cited

U.S. PATENT DOCUMENTS 10,461,821 B1  10/2019  Nammi et al.
10,594,456 B2  3/2020  Park et al.
(Continued)

FOREIGN PATENT DOCUMENTS

WO  2017/196083 A1  11/2017
WO  2017/196246 A2  11/2017
(Continued)

OTHER PUBLICATIONS

O-RAN Fronthaul Working Group, "Control, User and Synchronization Plane Specification", ORAN-WG4.CUS.0-v02.00, 2019.

*Primary Examiner* — Marcus Smith
(74) *Attorney, Agent, or Firm* — LRK Patent Law Firm

(57) ABSTRACT

Disclosed are a method and an apparatus for communication using fronthaul interfaces. An operation method of a first communication node includes transmitting a section type 8 message #1 including numerology-related information #1; transmitting a section type 9 message #1 including channel information of each of one or more second communication nodes indicated by the section type 8 message #1 and the numerology related information #1, transmitting a section type 8 message #2 including numerology-related information #2 other than the numerology-related information #1;
(Continued)

and transmitting a section type 9 message #2 including channel information of each of one or more third communication nodes indicated by the section type 8 message #2 and the numerology-related information #2.

16 Claims, 12 Drawing Sheets

(56) References Cited

U.S. PATENT DOCUMENTS

| | | | |
|---|---|---|---|
| 2018/0092084 A1 | 3/2018 | Yun et al. | |
| 2019/0289497 A1* | 9/2019 | Rajagopal | H04B 7/0456 |
| 2019/0327133 A1* | 10/2019 | Gao | H04L 41/082 |
| 2022/0021435 A1* | 1/2022 | Österling | H04L 5/0023 |

FOREIGN PATENT DOCUMENTS

| | | |
|---|---|---|
| WO | 2019/094818 A1 | 5/2019 |
| WO | 2019/135656 A1 | 7/2019 |

\* cited by examiner

------ : LLS-control plane ───── : LLS-user plane

METHOD AND APPARATUS FOR COMMUNICATION USING FRONTHAUL INTERFACE

CROSS-REFERENCE TO RELATED APPLICATIONS

This application claims priority to Korean Patent Applications No. 10-2019-0126364 filed on Oct. 11, 2019 and No. 10-2020-0127256 filed on Sep. 29, 2020 with the Korean Intellectual Property Office (KIPO), the entire contents of which are hereby incorporated by reference.

BACKGROUND

1. Technical Field

The present disclosure relates to a technique for transmitting and receiving data in a communication system, and more specifically, to a technique for efficiently transmitting and receiving data by using a fronthaul interface using mixed numerologies.

2. Description of Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

The communication system (hereinafter, a new radio (NR) communication system) using a higher frequency band (e.g., a frequency band of 6 GHz or above) than a frequency band (e.g., a frequency band of 6 GHz or below) of the long term evolution (LTE) (or, LTE-A) is being considered for processing of soaring wireless data. The 5G communication system can support enhanced mobile broadband (eMBB), ultra-reliable low-latency communication (URLLC), massive machine type communication (mMTC), and the like.

Meanwhile, an open-radio access network (O-RAN) alliance defines a fronthaul interface. The fronthaul interface may be an interface between an O-RAN distributed unit (O-DU) and an O-RAN radio unit (O-RU) constituting a base station (e.g., eNB, gNB, or the like). The O-DU may be referred to as a lower layer split-central unit (LLS-CU), and the O-RU may be referred to as a lower layer split-distributed unit (LLS-DU). The LLS-CU and LLS-DU may be terms used in the 3rd generation partnership project (3GPP). The fronthaul interface should be able to support mixed numerologies of the 5G communication system, and in this case, signaling overhead between the O-DU and the O-RU may increase, and thus, methods to solve this problem are required.

SUMMARY

Accordingly, exemplary embodiments of the present disclosure are directed to providing methods and apparatuses for performing communication by using a fronthaul interface supporting mixed numerologies.

According to a first exemplary embodiment of the present disclosure, an operation method of a first communication node may comprise: transmitting a section type 8 message #1 including numerology-related information #1; and transmitting a section type 9 message #1 including channel information of each of one or more second communication nodes indicated by the section type 8 message #1 and the numerology related information #1.

The operation method may further comprise: transmitting a section type 8 message #2 including numerology-related information #2 other than the numerology-related information #1; and transmitting a section type 9 message #2 including channel information of each of one or more third communication nodes indicated by the section type 8 message #2 and the numerology-related information #2.

Each of the numerology-related information #1 and the numerology-related information #2 may include frame structure information, cyclic prefix (CP) length information, time offset information, and frequency offset information.

Each of the section type 8 message #1 and the section type 8 message #2 may include a plurality of sections, and the plurality of sections may indicate different frequency offsets.

Channel information of the second communication node indicated by an identifier included in each of sections included in the section type 8 message #1 may be indicated by a section mapped to the identifier of the second communication node among sections included in the section type 9 message #1, and channel information of the third communication node indicated by an identifier included in each of sections included in the section type 8 message #2 may be indicated by a section mapped to the identifier of the third communication node among sections included in the section type 9 message #2.

The section type 8 message #1 may include information included in the section type 5 message for the O-RAN fronthaul interface and the numerology-related information #1, and the section type 8 message #2 may include the information included in the section type 5 message and the numerology-related information #2.

Each of the section type 9 message #1 and the section type 9 message #2 may be generated based on a section type 6 message for the O-RAN fronthaul interface.

The section type 8 message #1, the section type 8 message #2, the section type 9 message #1, and the section type 9 message #2 may be used for a channel-information-based-beamforming operation.

The first communication node may be an O-RAN distributed unit (O-DU), each of the one or more second communication nodes and the one or more third communication nodes may be an O-RAN radio unit (O-RU), and communication between the O-DU and the O-RU may be performed using the O-RAN fronthaul interface.

According to a second exemplary embodiment of the present disclosure, an operation method of a first communication node may comprise: transmitting a section type 8 message #1 including numerology-related information #1; and transmitting a section type 6 message #1 including channel information of each of one or more second communication nodes indicated by the section type 8 message #1.

The operation method may further comprise: transmitting a section type 8 message #2 including numerology-related information #2 other than the numerology-related information #1; and transmitting a section type 6 message #2 including channel information of each of one or more third communication nodes indicated by the section type 8 message #2.

Each of the numerology-related information #1 and the numerology-related information #2 may include frame structure information, cyclic prefix (CP) length information, time offset information, and frequency offset information.

Each of the section type 8 message #1 and the section type 8 message #2 may include a plurality of sections, and the plurality of sections may indicate different frequency offsets.

Channel information of the second communication node indicated by an identifier included in each of sections included in the section type 8 message #1 may be indicated by a section mapped to the identifier of the second communication node among sections included in the section type 9 message #1, and channel information of the third communication node indicated by an identifier included in each of sections included in the section type 8 message #2 may be indicated by a section mapped to the identifier of the third communication node among sections included in the section type 9 message #2.

The section type 8 message #1 may include information included in the section type 5 message for the O-RAN fronthaul interface and the numerology-related information #1, and the section type 8 message #2 may include the information included in the section type 5 message and the numerology-related information #2.

The first communication node may be an O-RAN distributed unit (O-DU), each of the one or more second communication nodes and the one or more third communication nodes may be an O-RAN radio unit (O-RU), and communication between the O-DU and the O-RU may be performed using the O-RAN fronthaul interface.

The first communication node may be an O-RAN distributed unit (O-DU), each of the one or more second communication nodes and the one or more third communication nodes may be an O-RAN radio unit (O-RU), and communication between the O-DU and the O-RU may be performed using the O-RAN fronthaul interface.

According to the present disclosure, a section type 8 message and a section type 9 message may be defined for a channel-information-based beamforming operation capable of supporting mixed numerologies. The section type 8 message may include numerology-related information, and the section type 9 message may include numerology-related information and channel information. When the section type 8 message and the section type 9 message are used, the channel-information-based beamforming operation capable of supporting mixed numerologies can be supported with a small signaling overhead. Alternatively, the section type 8 message may be defined for the channel-information-based beamforming operation, and the section type 8 message and a section type 6 message may be used. The section type 8 message may include numerology-related information, and the section type 6 message may include channel information. When the section type 8 message and the section type 6 message are used, the channel-information-based beamforming operation capable of supporting mixed numerologies can be supported with a small signaling overhead.

DETAILED DESCRIPTION OF THE EMBODIMENTS

Figure 1:
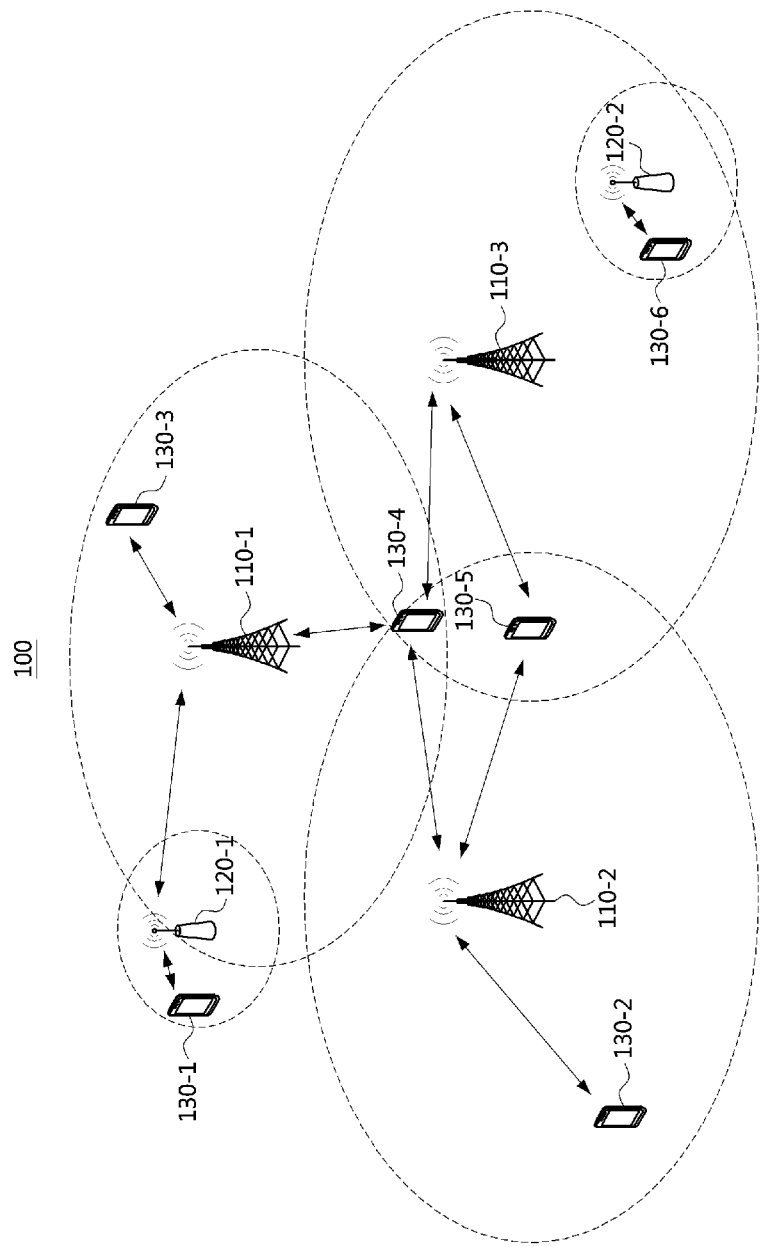
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

FIG. 1 is a conceptual diagram illustrating a first exemplary embodiment of a communication system.

Referring to FIG. 1, a communication system 100 may include a plurality of communication nodes 110-1, 110-2, 110-3, 120-1, 120-2, 130-1, 130-2, 130-3, 130-4, 130-5, and 130-6. The plurality of communication nodes may support 4G communication (e.g., long term evolution (LTE) or LTE-advanced (LTE-A)), 5G communication (e.g., new radio (NR)), or the like specified in the 3rd generation partnership project (3GPP) standards. The 4G communication may be performed in a frequency band of 6 GHz or below, and the 5G communication may be performed in a frequency band of 6 GHz or above as well as a frequency band of 6 GHz or below.

For example, for the 4G communication and 5G communication, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may include a serving-gateway (S-GW), packet data network (PDN)-gateway (P-GW), and mobility management entity (MME)). When the communication system 100 supports the 5G communication system (e.g., NR system), the core network may include an access and mobility management function (AMF), a user plane function (UPF), a session management function (SMF), and the like.

Meanwhile, each of the plurality of communication nodes 110-1, 110-2, 110-3, 120-1, 120-2, 130-1, 130-2, 130-3, 130-4, 130-5, and 13-6 constituting the communication system 100 may have the following structure.

Figure 2:
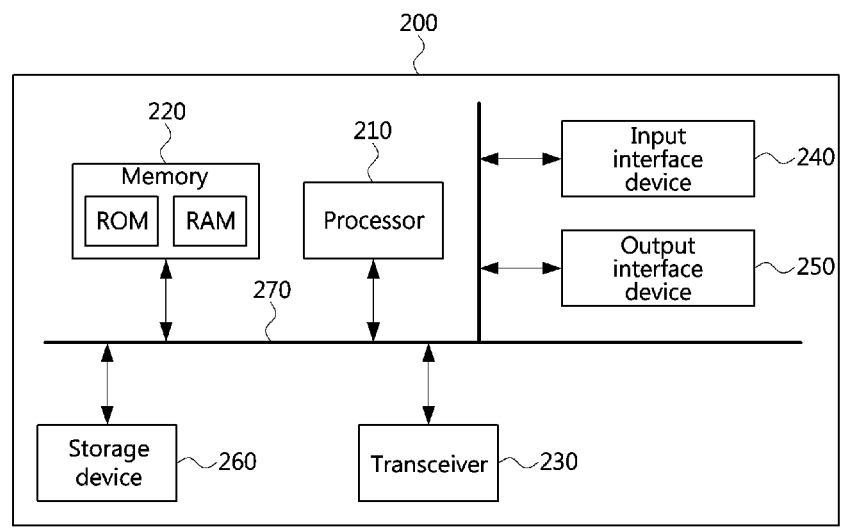
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each of the components included in the communication node 200 may be connected with the processor 210 not through the common bus 270 but through an individual interface or an individual bus. For example, the processor 210 may be connected to at least one of the memory 220, the transceiver 230, the input interface device 240, the output interface device 250, and the storage device 260 through a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, an evolved Node-B (eNB), an advanced base station (BTS), a radio base station, a radio transceiver, an access point, an access node, a roadside unit (RSU), a radio remote head (RRH), a transmission point (TP), a transmission and reception point (TRP), an eNB, a gNB, or the like.

Each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of Thing (IoT) device, a mounted apparatus (i.e., mounted module/device/terminal, on-board device/terminal, etc.), or the like.

Meanwhile, in a communication system, a base station (e.g., eNB, gNB, etc.) may support a fronthaul interface. Here, the fronthaul interface may be a fronthaul interface defined by an open-radio access network (O-RAN) alliance. In this case, the base station may be configured with an O-RAN distributed unit (O-DU) and one or more O-RAN radio units (O-RUs). Communication between the O-DU and the one or more O-RUs may be performed through the fronthaul interfaces. The fronthaul interface may support mixed numerologies. The O-DU may be a lower layer split-central unit (LLS-CU) specified in the 3GPP, and the O-RU may be a lower layer split-distributed unit (LLS-DU) specified in the 3GPP.

Hereinafter, communication methods in the fronthaul will be described. Even when a method (e.g., transmission or reception of a signal) performed at a first communication node among communication nodes is described, the corresponding second communication node may perform a method (e.g., reception or transmission of the signal) corresponding to the method performed at the first communication node. That is, when an operation of an O-DU is described, the corresponding O-RU may perform an operation corresponding to the operation of the O-DU. Conversely, when an operation of the O-RU is described, the corresponding O-DU may perform an operation corresponding to the operation of the O-RU.

Figure 3:
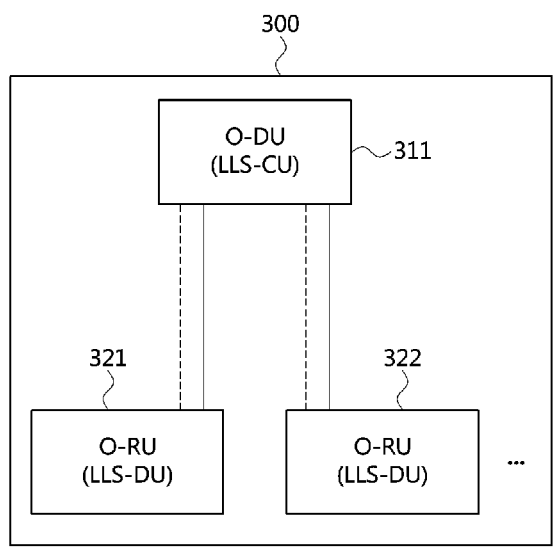
FIG. 3 is a block diagram illustrating a first exemplary embodiment of a base station supporting lower layer split (LLS) in a communication system.

FIG. 3 is a block diagram illustrating a first exemplary embodiment of a base station supporting lower layer split (LLS) in a communication system.

Referring to FIG. 3, a base station 300 may include an O-DU 311, an O-RU #1 321, an O-RU #2 322, and the like. For example, the base station 300 may include a plurality of O-RUs. Communication between the O-DU 311 and the O-RUs 321 and 322 may be performed through fronthaul interfaces. The fronthaul interface may include an LLS-control plane and an LLS-user plane.

The O-DU 311 may be a logical node that performs a radio link control (RLC) layer function, a medium access control (MAC) layer function, and a high-physical (PHY) layer function. The O-DU 311 may control the plurality of O-RUs 321 and 322. Each of the O-RUs 321 and 322 may be a logical node that performs a low-PHY layer function and a radio frequency (RF) processing function. The O-RUs 321 and 322 may transmit and receive control information and/or data by performing communication with the O-DU 311. The control information may be real-time control information. The data may be user plane data. The O-RUs 321 and 322 may operate based on the control of the O-DU 311.

Figure 4:
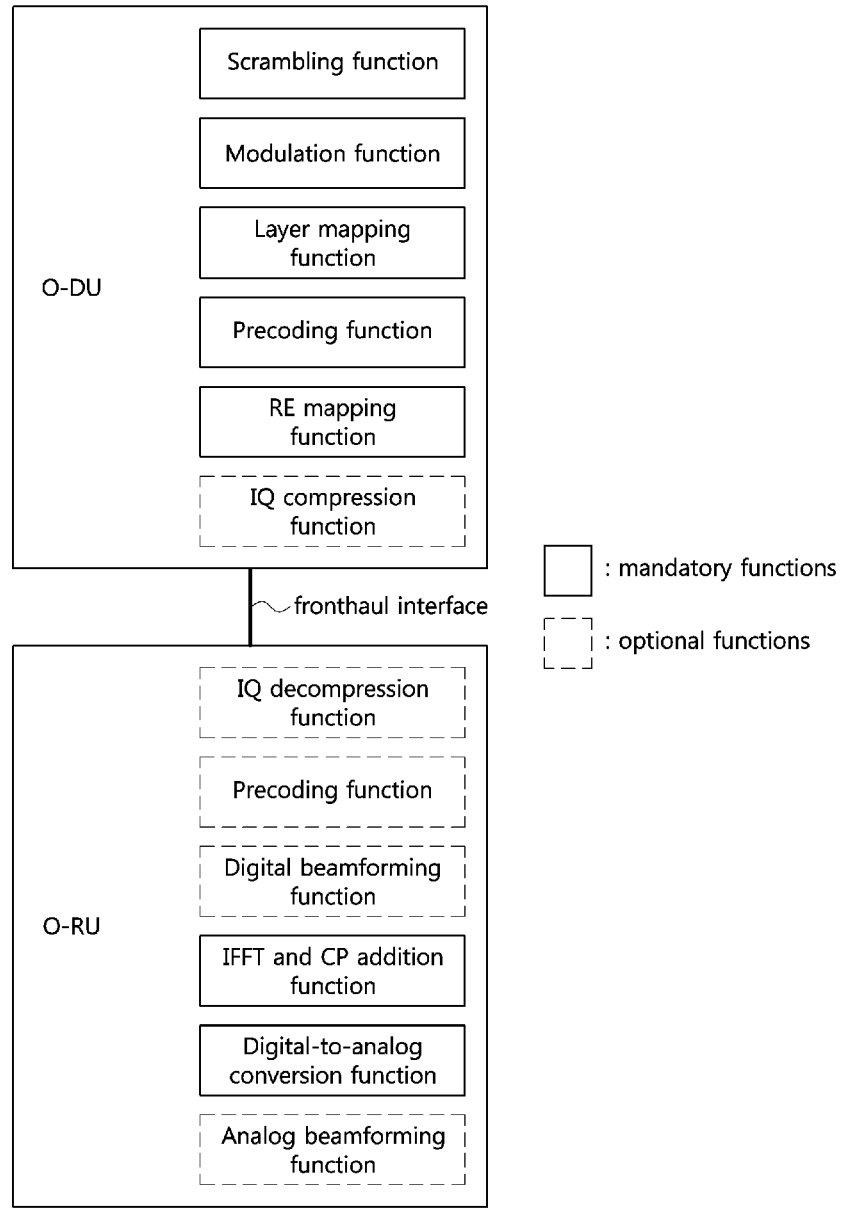
FIG. 4 is a conceptual diagram illustrating functions of each of O-DU and O-RU in a communication system.

FIG. 4 is a conceptual diagram illustrating functions of each of O-DU and O-RU in a communication system.

Referring to FIG. 4, the O-DU may perform a rate matching function, a coding function, a scrambling function, a modulation function, a layer mapping function, a precoding function, a resource element (RE) mapping function, an IQ compression function, and the like. The precoding function may not be performed in a specific mode (e.g., bypass mode). For example, when the precoding function is performed in the O-RU, the precoding function may not be performed in the O-DU. The IQ compression function may be optionally performed.

The O-RU may perform an OFDM phase compensation function, an IQ decompression function, a precoding function, a digital beamforming function, an inverse fast Fourier transform (IFFT) and cyclic prefix (CP) addition function, a digital-to-analog conversion function, an analog beamforming function, and the like. The IQ decompression function, precoding function, digital beamforming function, and analog beamforming function may be optionally performed.

The O-RU may be classified into an O-RU category A and an O-RU category B. O-RUs belonging to the O-RU category A may not support the precoding function. O-RUs belonging to the O-RU category B may support the precoding function. Both the O-RU category A and the O-RU category B may optionally perform the digital beamforming function and/or the analog beamforming function.

Data (e.g., user plane data) may be transmitted and received through the fronthaul interface based on RE and/or physical resource block (PRB). A method of transmitting and receiving downlink data using the fronthaul interface may be as follows.

Figure 5:
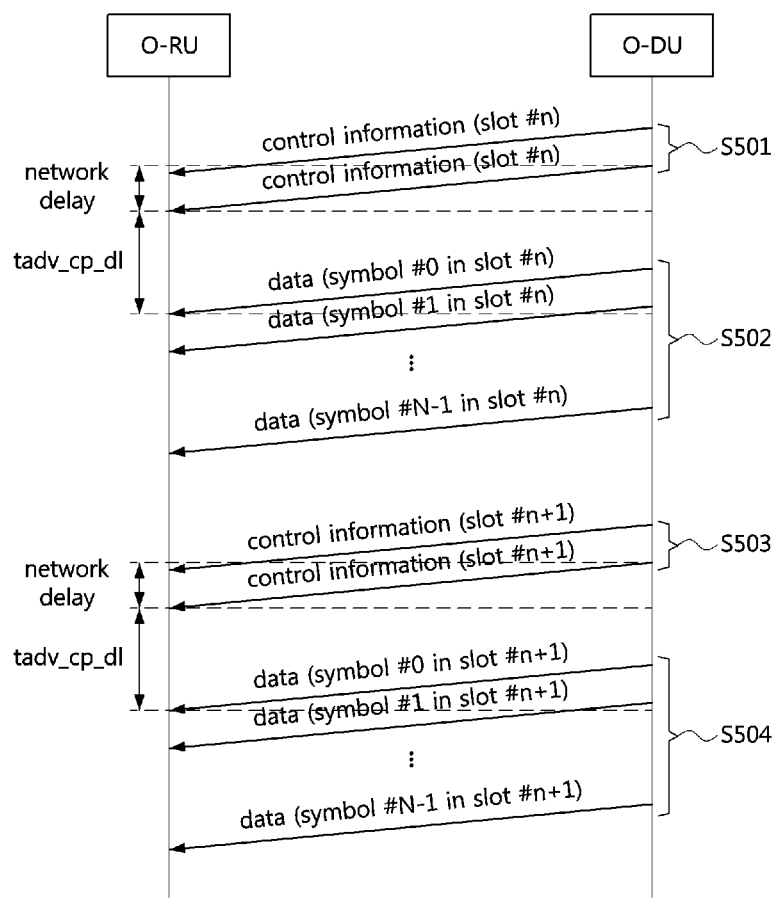
FIG. 5 is a sequence chart illustrating a first exemplary embodiment of a method for transmitting and receiving downlink data in a communication system.

FIG. 5 is a sequence chart illustrating a first exemplary embodiment of a method for transmitting and receiving downlink data in a communication system.

Referring to FIG. 5, a base station may be composed of an O-DU and one or more O-RUs. Communication between the O-DU and O-RU(s) may be performed using the fronthaul interfaces. The O-DU may be the O-DU 311 shown in FIG. 3 and may perform the function(s) shown in FIG. 4. The O-RU may be the O-RU 321 or 322 shown in FIG. 3 and may perform the function(s) shown in FIG. 4.

The O-DU may transmit a message (e.g., control plane message) including control information for transmission of data (e.g., user plane message) for a slot #n to the O-RU before transmission of the data (e.g., user plane message) for the slot #n by using the fronthaul interface (S501). The O-RU may receive the control information from the O-DU through the fronthaul interface. Here, n may be a natural number. The control information may be used to inform the O-RU of a scheme of processing the data (e.g., user plane message). For example, the control information may include scheduling information, beamforming information, and the like.

One control plane message may include control information for a plurality of user plane messages (e.g., a plurality of data). A plurality of control plane messages may be transmitted for one slot. In addition, a plurality of user plane messages may be transmitted for one slot. When the O-RU category A is supported, control plane messages having different extended antenna carrier (eAxC) IDs for respective streams may be transmitted. When the O-RU category B is supported, control plane messages having different eAxC IDs for respective layers may be transmitted. When different numerologies (e.g., FFT size, subcarrier (SC) spacing, CP length, etc.) are used, different control plane messages may be used. One control plane message may include a plurality of sections, and different beams may be used for the respective sections.

The O-DU may transmit the data (e.g., user plane data) for the slot #n to the O-RU (S502). The data (e.g., user plane data) received by the O-RU in the step S502 may be processed based on the control information received in the step S501. Each data (e.g., user plane data) may include data for each symbol (e.g., OFDM symbol #0, #1, #2, . . . , #N−1) transmitted in the slot #n, and a plurality of user plane messages may be transmitted for one slot. N may be a natural number. The control plane message may be transmitted for each slot, and the user plane message associated with the corresponding control plane message may be transmitted on a symbol basis. Each data (user plane message) may include IQ data for generating an OFDM symbol.

When the transmission/reception operation of downlink data (e.g., user plane messages) for the slot #n is completed, a transmission/reception operation of downlink data (e.g., user plane messages) for the slot #n+1 may be performed. For example, in the step S503, the O-DU may transmit a message (e.g., control plane message) including control information on the downlink data (e.g., user plane messages) for the slot #n+1 to the O-RU by using the fronthaul interface, and the O-RU may receive the corresponding control information through the fronthaul interface. The data (e.g., user plane data) received by the O-RU in the step S504 may be processed based on the control information received in the step S503. Each data (e.g., user plane data) may include data for each symbol transmitted in the slot #n+1, and a plurality of user plane messages may be transmitted for one slot from the O-DU to the O-RU using the fronthaul interface.

In the downlink data transmission/reception procedure, tadv_cp_dl may be the minimum time between a reception time of the control plane message at the O-RU and a reception time of the first user plane data associated with the corresponding control plane message at the O-RU. In order to support data transmission using multi-symbols, the control plane message may be received before tadv_cp_dl from the reception of the user plane message including the earliest symbol (e.g., lowest-numbered symbol) among the associated user plane messages.

Figure 6:
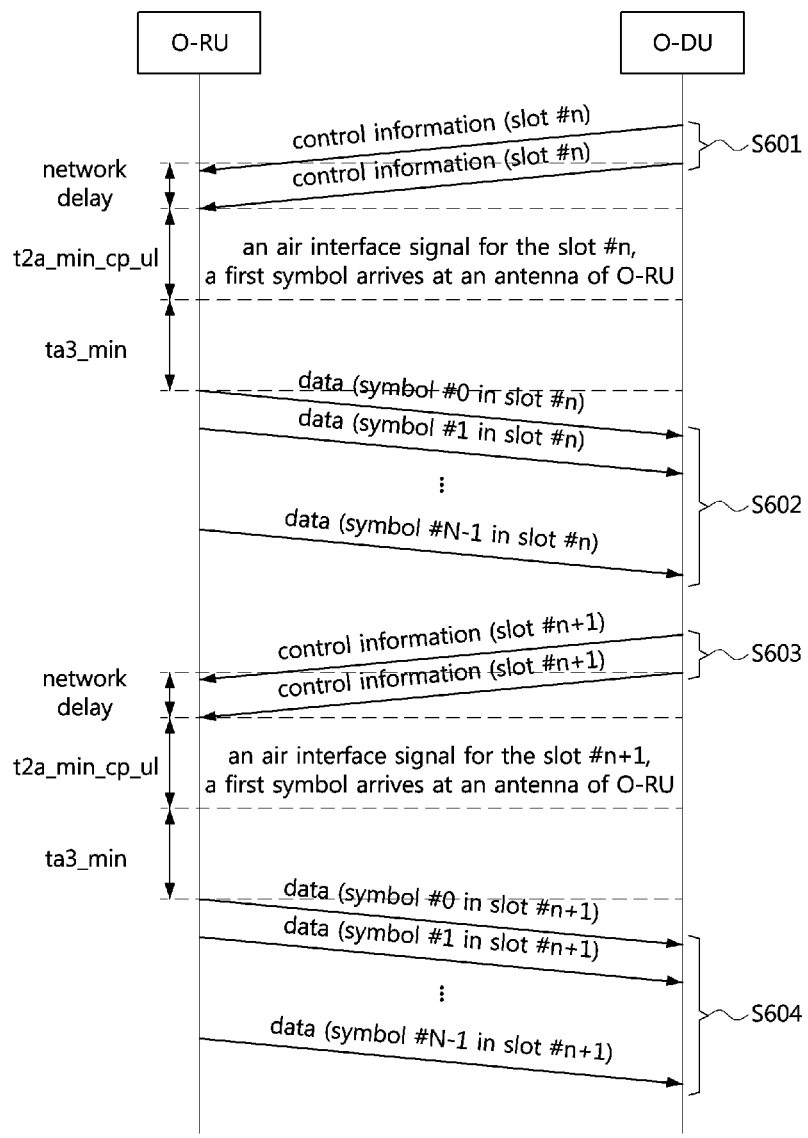
FIG. 6 is a sequence chart illustrating a first exemplary embodiment of a method for transmitting and receiving uplink data in a communication system.

FIG. 6 is a sequence chart illustrating a first exemplary embodiment of a method for transmitting and receiving uplink data in a communication system.

Referring to FIG. 6, a base station may be composed of an O-DU and one or more O-RUs. Communication between the O-DU and O-RU(s) may be performed using the fronthaul interfaces. The O-DU may be the O-DU 311 shown in FIG. 3 and may perform the function(s) shown in FIG. 4. The O-RU may be the O-RU 321 or 322 shown in FIG. 3 and may perform the function(s) shown in FIG. 4.

The O-DU may transmit a message (e.g., control plane message) including control information for transmission of data (e.g., user plane message) for a slot #n to the O-RU using the fronthaul interface (S601). The O-RU may receive the control information from the O-DU through the fronthaul interface. Here, n may be a natural number. The control information may be used to inform the O-RU of a scheme of processing the data (e.g., user plane message). For example, the control information may include scheduling information, beamforming information, and the like.

One control plane message may include control information for a plurality of user plane messages (e.g., a plurality of data). A plurality of control plane messages may be transmitted for one slot. In addition, a plurality of user plane messages may be transmitted for one slot. When different numerologies (e.g., FFT size, SC spacing, CP length, etc.) are used, different control plane messages may be used. One control plane message may include a plurality of sections, and different beams may be used for the respective sections.

The O-RU may transmit the data (e.g., user plane data) for the slot #n to the O-DU (S602). The data (e.g., user plane data) transmitted by the O-RU in the step S602 may be processed based on the control information received in the step S601. Each data (e.g., user plane data) may include data for each symbol (e.g., OFDM symbols #0, #1, #2, . . . , #N−1) received in the slot #n, and a plurality of user plane messages may be transmitted for one slot. N may be a natural number. The control plane message may be transmitted for each slot, and a user plane message associated with the corresponding control plane message may be transmitted on a symbol basis. Each data (e.g., user plane message) may include IQ data obtained by processing each OFDM symbol received by the O-RU.

When the transmission/reception operation of the uplink data (e.g., user plane messages) for the slot #n is completed, a transmission/reception operation of uplink data (e.g., user plane messages) for the slot #n+1 may be performed. For example, in the step S603, the O-DU may transmit a message (e.g., control plane message) including control information for the uplink data (e.g., user plane messages) for the slot #n+1 to the O-RU using the fronthaul interface, and the O-RU may receive the corresponding control information through the fronthaul interface. The data (e.g., user plane data) transmitted by the O-RU in the step S604 may be processed based on the control information received in the step S603. Each data (e.g., user plane data) may include data for each symbol received in the slot #n+1, and a plurality of user plane messages may be transmitted for one slot from the O-RU to the O-DU by using the fronthaul interface.

In the uplink data transmission/reception procedure, t2a_min_cp_ul may be the minimum time from a reception time of the control plane message at the O-RU until a reception time of the first OFDM symbol associated with the corresponding control plane message at an antenna of the O-RU. In order to support data transmission using multi-symbols, the control plane message may be received before t2a_min_cp_ul from the reception of the earliest symbol (e.g., lowest-numbered symbol) associated with the corresponding control plane message.

Meanwhile, the section types of the control plane provided by the fronthaul interface may be as shown in Table 1 below.

TABLE 1

| Section type | Target scenario | Description |
|---|---|---|
| 0 | Resource blocks (RBs) and/or symbols not used for downlink or uplink | Indicates to the O-RU that specific RBs or symbols are not used (e.g., indicate that transmission may be halted for power saving, calibration, or the like during idle periods, guard periods, or a specific idle interval). There is no an associated user plane message (e.g., IQ data). |
| 1 | Most DL/UL radio channels (most basic type) | Used for a general channel that does not need a time offset and/or a frequency offset for mixed numerology channel |
| 2 | Reserved for further use | |
| 3 | PRACH and mixed numerology channels | Used for a channel that needs a time offset and/or a frequency offset such as a PRACH or a mixed numerology channel |
| 4 | Reserved fo further use | |
| 5 | UE scheduling information (UE-ID assignment to a section) | Used for provision of scheduling information (e.g., coscheduling information) for a UE-ID. |
| 6 | Channel information | Used for provision of UE-specific channel information from an O-DU to an O-RU |
| 7 | LAA | Used for LAA |
| 8-255 | Reserved for further use | |

The section type 5 and the section type 6 may be types associated with each other. The O-RU may generate a beam by using information on a scheduled UE and channel information for the corresponding UE(s) based on the section type 5 message and the section type 6 message. When the section type 5 message and the section type 6 message are used, among beamforming schemes, a 'UE channel-information-based real-time beamforming scheme (hereinafter, referred to as 'channel information transmission scheme')' may be used. When the section type 1 message or the section type 3 message is used, among the beamforming schemes, a beam index transmission scheme, a real-time weight transmission scheme, or a beam attribute transmission scheme may be used.

Beamforming schemes supported by the fronthaul interface may be as follows.

(1) Beam Index Transmission Scheme

The O-DU may specify and indicate a beam ID (i.e., beamId) for a beam (e.g., predefined beam) to be used in the O-RU.

A beam ID (i.e., beamId) may be specified in a data section of the control plane.

Both digital beamforming and analog beamforming may be applied.

The O-RU may store weights for a beam ID (i.e., beamId). For example, the weights for the beam ID (i.e., beamId) may be stored when manufacturing the O-RU. Alternatively, the O-DU may inform the O-RU of the weights for the beam ID (i.e., beamId).

(2) Real-Time Weight Transmission Scheme

Beamforming weights may be delivered. Here, compression for the beamforming weights may be possible.

The O-RU may provide antenna array related information to the O-DU at startup.

A section extension 1 may be used.

The beamforming weights that have already been delivered do not need to be transmitted again. For example, a beam ID (i.e., beamId) may be assigned to the beamforming weights. That is, the already-delivered beamforming weights may be designated by the beam ID (i.e., beamId).

(3) Beam Attribute Transmission Scheme

A beam description may be transmitted instead of the entire beam weights.

A section extension 2 may be used.

The O-RU may generate appropriate weights based on the beam attribute.

(4) Channel information transmission scheme

Channel information may be transmitted instead of the beam weights. The section type 6 may be used. The channel information may not be transmitted per slot.

UE scheduling information may be transmitted per slot. The section type 5 may be used.

The O-RU may generate weights using channel information and UE scheduling information.

When the section type 1 message and the section type 3 message are used, a beamforming index, beamforming weights, or a beamforming attribute may be mapped to RE(s). The beam index transmission scheme, real-time weight transmission scheme, or beamforming attribute transmission scheme may be used between the O-DU and the O-RU. In case of transmitting data using mixed numerologies, if the section type 3 message is used between the O-RU and the O-DU, parameters related to various numerologies in addition to a specific preconfigured numerology may be specified in the section type 3 message, and used, whereby the fronthaul signaling overhead may be reduced. In the case of the section type 1 message, parameters (e.g., frameStructure, timeOffset, and cpLength, freqOffset, etc.) related to one pre-specified numerology may be used for one end point (e.g., data flow using the same eAxC). Therefore, when at least one parameter among the above-described parameters is changed, a plurality of end points using different parameters may be used. Alternatively, a plurality of section type 1 control plane messages may be transmitted. When the section type 3 message is used, the above-described overhead may be reduced.

When the channel information transmission scheme is used, the section type 1 message and the section type 3 message cannot be used, and the section type 5 message and the section type 6 message may be used. The section type 5 message and the section type 6 message may not include information elements (e.g., frameStructure, timeOffset, cpLength, freqOffset, etc.) for a mixed numerology channel. Therefore, when the channel information transmission scheme and mixed numerologies are used at the same time, information elements for a mixed numerology channel may not be informed. Accordingly, overhead may occur due to use of a plurality of end points, transmission of a plurality of section type 5 messages, or transmission of a plurality of section type 6 messages. Methods for solving this problem will be described below.

Among the control plane messages, the section type 1 message may include information elements (e.g., fields) described in Tables 2 to 4 below. The information elements listed in Table 2 may be common for most control plane messages. The information elements listed in Table 4 may be included in the section type 1 message as needed.

TABLE 2

Section type 1 message

| 0 (MSB) | 1 | 2 | 3 | 4 | 5 | 6 | 7 (LSB) | Number of bytes | Octet |
|---|---|---|---|---|---|---|---|---|---|
| transport header | | | | | | | | 8 | 1 |
| data Direction | payloadVersion | | | | filterIndex | | | 1 | 9 |
| frameId | | | | | | | | 1 | 10 |
| subframeId | | | | slotId | | | | 1 | 11 |
| slotId | | | startSymbolId | | | | | 1 | 12 |
| numberOfsetctions | | | | | | | | 1 | 13 |
| sectionType = 1 | | | | | | | | 1 | 14 |
| udCompHdr | | | | | | | | 1 | 15 |
| reserved | | | | | | | | 1 | 16 |

TABLE 3

Section type 1 message

| 0 (MSB) | 1 | 2 | 3 | 4 | 5 | 6 | 7 (LSB) | Number of bytes | Octets |
|---|---|---|---|---|---|---|---|---|---|
| sectionId | | | | | | | | 1 | 17 |
| sectionId | | rb | symInc | | startPrbc | | | 1 | 18 |
| startPrbc | | | | | | | | 1 | 19 |
| numPrbc | | | | | | | | 1 | 20 |
| reMask [11:4] | | | | | | | | 1 | 21 |
| reMask [3:0] | | | | numSymbol | | | | 1 | 22 |
| ef = 1 | | | | beamId [14:8] | | | | 1 | 23 |
| beamId [7:0] | | | | | | | | 1 | 24 |
| section extensions as indicated by "ef" | | | | | | | | var | 25 |
| . . . | | | | | | | | | |

TABLE 4

Section type 1 message

| 0 (MSB) | 1 | 2 | 3 | 4 | 5 | 6 | 7 (LSB) | Number of bytes | Octet |
|---|---|---|---|---|---|---|---|---|---|
| sectionId | | | | | | | | | N |
| sectionId | | rb | symInc | | startPrbc | | | 1 | N + 1 |
| startPrbc | | | | | | | | 1 | N + 2 |
| numPrbc | | | | | | | | 1 | N + 3 |
| reMask [11:4] | | | | | | | | 1 | N + 4 |
| reMask [3:0] | | | | numSymbol | | | | 1 | N + 5 |
| ef = 0 | | | | beamId [14:8] | | | | 1 | N + 6 |
| beamId [7:0] | | | | | | | | 1 | N + 7 |
| section extensions as indicated by "ef" | | | | | | | | var | N + 8 M |

The transport header may be an enhanced common public radio interface (eCPRI) common header. The dataDirection set to 0 may indicate uplink (UL). The dataDirection set to 1 may indicate downlink (DL). The filterIndex may be used to designate a channel filter of the O-RU. The filterIndex may be generally set to 0. The frameId may indicate a specific frame having a length of 10 milliseconds (ms). The subframeId may indicate a specific subframe having a length of 1 ms within the frame. The slotId may indicate a specific slot within the frame.

The startSymbolId may indicate the first symbol number in the slot to which the corresponding message (e.g., section type 1 message) is applied. The numberOfsections may indicate the number of sections included in the corresponding message. The sectionType may indicate the section type of the message. In the case of the section type 1 message, the sectionType may be set to 1. Here, one section type may be used in one control plane message. The udCompHdr may indicate the IQ bit width and compression scheme. The upper 4 bits of udCompHdr may indicate the IQ bit width, and the range of the IQ bit width may be 1 to 16 bits. The lower 4 bits of udCompHdr may indicate the compression scheme.

The sectionID may be used to discriminate sections. In addition, the sectionID may be used for matching control/user plane messages. The rb set to 0 may indicate that every PRBs are used. The rb set to 1 may indicate that every other PRBs are used. The symInc set to '0' may indicate that the same symbol as in the previous section is described. The symInc set to 1 may indicate 'symbol position of the previous section+numSymbol of the previous section'.

The startPrbc may indicate the first PRB to which the section is applied. The numPrbc may indicate the number of PRBs to which the section is applied. The numSymbol may indicate the number of symbols to which the section is applied. The ef set to 0 may indicate that there is no section extension. The ef set to 1 may indicate that a section extension (e.g., section extension including beamforming weights) exists. The beamId may indicate predefined beamforming weights for the corresponding section. The beamId set to 0 may not indicate beamforming weights.

Meanwhile, in the section type 1 message and the section type 3 message, a beamforming index, beamforming weights, and/or a beamforming attribute may be mapped to RE(s). Therefore, when the section type 1 message and the section type 3 message are used, the beam index transmission scheme, the real-time weight transmission scheme, and the beam attribute transmission scheme may be supported.

The O-DU should inform the O-RU of numerology-related information to be used, and the numerology-related information may be informed to the O-RU by statically configuring parameters such as frameStructure, timeOffset, cpLength, freqOffset, etc. in a management plane. Parameters related to one numerology may be indicated per end point (e.g., data flow using the same eAxC) in the management plane.

The numerology-related information may include frameStructure, timeOffset, cpLength, freqOffset, and the like. The frameStructure may indicate the FFT size, subcarrier spacing, and the like. The timeOffset may be the number of samples from the start of the slot to the start of the cyclic prefix (CP). The cpLength may indicate the length of CP. The freqOffset may be an offset from a center carrier. The freqOffset may be set in units of subcarrier spacings.

The section type 1 message may not include separate numerology-related information. Therefore, when the section type 1 message is used, parameters related to one numerology statically designated for one end point in advance in the management plane may be applied. The previously-configured parameters cannot be changed by the section type 1 message, and various types of parameters cannot be specified in one control plane message. Therefore, when there is at least one parameter that should be changed from the parameters configured by the control plane among the numerology-related parameters, a plurality of end points using different parameters may be used. Alternatively, a plurality of section type 1 control plane messages may be transmitted. In addition, even when the same frameStructure is used, if the frequency offsets (freqOffset) are different, a separate control plane message should be transmitted for each frequency offset, and thus signaling overhead may increase when mixed numerologies are used.

In order to solve the above-described problem and to efficiently support a PRACH and a mixed numerology channel, the section type 3 message may be used. The section type 3 message may further include frameStructure, timeOffset, cpLength, and freqOffset compared to the section type 1 message. The section type 3 message may include information elements (e.g., fields) described in Tables 5 to 7 below.

TABLE 5

| Section type 3 message | | | | | | | | | |
|---|---|---|---|---|---|---|---|---|---|
| 0 (MSB) | 1 | 2 | 3 | 4 | 5 | 6 | 7 (LSB) | Number of bytes | Octet |
| transport header | | | | | | | | 8 | 1 |
| data Direction | payloadVersion | | | | filterIndex | | | 1 | 9 |
| frameId | | | | | | | | 1 | 10 |
| subframeId | | | | slotId | | | | 1 | 11 |
| slotId | | startSymbolid | | | | | | 1 | 12 |
| numberOfsetctions | | | | | | | | 1 | 13 |
| sectionType = 3 | | | | | | | | 1 | 14 |
| timeOffset | | | | | | | | 2 | 15 |
| frame Structure | | | | | | | | 1 | 17 |
| cpLength | | | | | | | | 2 | 18 |
| udCompHdr | | | | | | | | 1 | 20 |

TABLE 6

| Section type 3 message | | | | | | | | | |
|---|---|---|---|---|---|---|---|---|---|
| 0 (MSB) | 1 | 2 | 3 | 4 | 5 | 6 | 7 (LSB) | Number of bytes | Octet |
| sectionId | | | | | | | | 1 | 21 |
| sectionId | rb | symInc | | startPrbc | | | | 1 | 22 |
| startPrbc | | | | | | | | 1 | 23 |
| numPrbc | | | | | | | | 1 | 24 |
| reMask [11:4] | | | | | | | | 1 | 25 |
| reMask [3:0] | | | | numSymbol | | | | 1 | 26 |
| Ef | | beamId [14:8] | | | | | | 1 | 27 |
| beamId [7:0] | | | | | | | | 1 | 28 |
| freqOffset | | | | | | | | 3 | 29 |
| Reserved | | | | | | | | 1 | 32 |
| section extensions as indicated by "ef" | | | | | | | | var | 33 |
| . . . | | | | | | | | | |

TABLE 7

| Section type 3 message | | | | | | | | | |
|---|---|---|---|---|---|---|---|---|---|
| 0 (MSB) | 1 | 2 | 3 | 4 | 5 | 6 | 7 (LSB) | Number of bytes | Octet |
| sectionId | | | | | | | | | N |
| sectionId | rb | symInc | | startPrbc | | | | 1 | N + 1 |
| startPrbc | | | | | | | | 1 | N + 2 |
| numPrbc | | | | | | | | 1 | N + 3 |

TABLE 7-continued

| Section type 3 message | | | | | | | | | |
|---|---|---|---|---|---|---|---|---|---|
| 0 (MSB) | 1 | 2 | 3 | 4 | 5 | 6 | 7 (LSB) | Number of bytes | Octet |
| reMask [11:4] | | | | | | | | 1 | N + 4 |
| reMask [3:0] | | | | numSymbol | | | | 1 | N + 5 |
| Ef | | beamId [14:8] | | | | | | 1 | N + 6 |
| beamId [7:0] | | | | | | | | 1 | N + 7 |
| freqOffset | | | | | | | | 3 | N + 8 |
| Reserved | | | | | | | | 1 | N + 11 |
| section extensions as indicated by "ef" | | | | | | | | var | N + 12 M |

When the section type 3 message is used, frameStructure, timeOffset, cpLength, freqOffset, and the like may be indicated. Therefore, when parameters different from the parameters configured by the management plane are used, the corresponding parameters may be indicated by the section type 3 message. That is, when the section type 3 message is used, a control plane message having various numerology related configurations may be transmitted using only one end point (e.g., data flow using the same eAxC). Each section in the section type 3 message may indicate a frequency offset (freqOffset). Therefore, various frequency offsets indicated by the section type 3 message (e.g., control plane) may be used instead of the parameters previously designated by the management plane. Even when a mixed numerology channel with different frequency offsets is used, multiple control plane messages (e.g., section type 1 messages or section type 3 messages) for each of the different frequency offsets may not be required. Since different frequency offsets may be indicated by the respective sections included in one control plane message (e.g., section type 3 message), signaling overhead of information on the mixed numerology channel may be reduced. However, when frameStructure, timeOffset, cpLength, etc. among the numerology-related parameters are changed, a plurality of section type 3 messages may be required.

Figure 7:
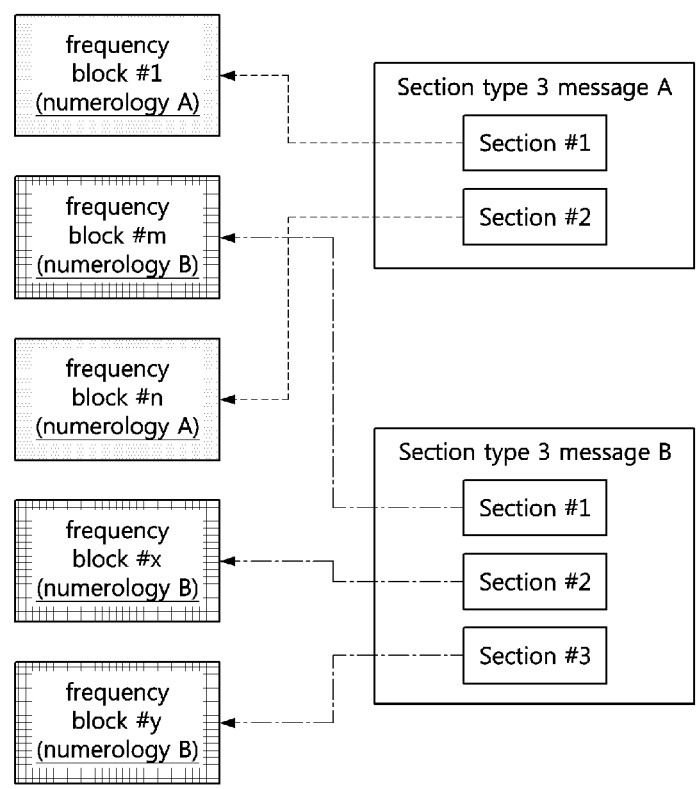
FIG. 7 is a conceptual diagram illustrating a first exemplary embodiment of a communication method using a section type 3 message in a communication system.

FIG. 7 is a conceptual diagram illustrating a first exemplary embodiment of a communication method using a section type 3 message in a communication system.

Referring to FIG. 7, a communication method using a section type 3 message may be performed by an O-DU and an O-RU constituting a base station. That is, a base station operation using a fronthaul including a beamforming operation may be performed using the section type 3 message. Two numerologies (e.g., numerologies A and B using different frameStructure settings) may be used, two frequency blocks (e.g., frequency blocks #1 and #n) using the numerology A may be configured, and three frequency blocks (e.g., frequency blocks #m, #x, and #y) using the numerology B may be configured. The frequency block may be one PRB or a set of a plurality of PRBs. Each of n, m, x, and y may be a natural number.

In this case, a section type 3 message for each of the two numerologies may be transmitted. For example, a section type 3 message A may be used for the numerology A, and the section type 3 message A may include a section #1 indicating the frequency block #1 and a section #2 indicating the frequency block #n. That is, each of the sections #1 and #2 included in the section type 3 message A may indicate a different frequency offset (freqOffset). A section type 3 message B may be used for the numerology B, and the section type 3 message B may include a section #1 indicating the frequency block #m, a section #2 indicating the frequency block #x, and a section 3 indicating the frequency block #y. That is, each of the sections #1 to #3 included in the section type 3 message B may indicate a different frequency offset (freqOffset).

On the other hand, when a section type 1 message is used and different frequency offsets are used, a section type 1 message for each of the different frequency offsets may be transmitted. That is, a separate control plane message (e.g., section type 1 message) for each of the frequency blocks may be transmitted, and each of the corresponding control plane messages may have a different eAxC ID. In this case, since signaling overhead increases, it may be inappropriate to use the section type 1 message to transmit information of a mixed numerology channel.

The section type 1 message and the section type 3 message may be used to support the beam index transmission scheme, the real-time weight transmission scheme, and/or the beam attribute transmission scheme, and the section type 5 message and the section type 6 message may be used to support the channel-information transmission scheme. The section type 5 message may include information elements (e.g., fields) described in Tables 8 to 10 below. Each section of the section type 5 message may include ueId instead of beamId, and may notify that a specific UE is assigned to a specific resource. The ueId may indicate an ID of a terminal (e.g., UE ID) associated with the channel state information. The section type 5 message may be used to inform scheduling information of the terminal indicated by ueId.

TABLE 8

| | | | Section type 5 message | | | | | |
|---|---|---|---|---|---|---|---|---|
| 0 (MSB) | 1 | 2 | 3 | 4 | 5 | 6 | 7 (LSB) | Number of bytes | Octet |
| | | transport header | | | | | | 8 | 1 |
| data Direction | | payloadVersion | | | filterIndex | | | 1 | 9 |
| | | | frameId | | | | | 1 | 10 |
| | subframeId | | | | slotId | | | 1 | 11 |
| slotId | | | startSymbolid | | | | | 1 | 12 |
| | | | numberOfsetctions | | | | | 1 | 13 |
| | | | sectionType = 5 | | | | | 1 | 14 |
| | | | udCompHdr | | | | | 1 | 15 |
| | | | reserved | | | | | 1 | 16 |

TABLE 9

| | | | Section type 5 message | | | | | |
|---|---|---|---|---|---|---|---|---|
| 0 (MSB) | 1 | 2 | 3 | 4 | 5 | 6 | 7 (LSB) | Number of bytes | Octet |
| | | | sectionId | | | | | 1 | 17 |
| sectionId | | | rb | symInc | | startPrbc | | 1 | 18 |
| | | | startPrbc | | | | | 1 | 19 |
| | | | numPrbc | | | | | 1 | 20 |
| | | | reMask [11:4] | | | | | 1 | 21 |
| reMask [3:0] | | | | numSymbol | | | | 1 | 22 |
| ef | | | ueId [14:8] | | | | | 1 | 23 |
| | | | ueId [7:0] | | | | | 1 | 24 |
| | | section extensions as indicated by "ef" | | | | | | var | 25 |
| ... | | | | | | | | | |

TABLE 10

| | | | Section type 5 message | | | | | |
|---|---|---|---|---|---|---|---|---|
| 0 (MSB) | 1 | 2 | 3 | 4 | 5 | 6 (LSB) | 7 | Number of bytes | Octet |
| | | | sectionId | | | | | | N |
| sectionId | | | rb | symInc | | startPrbc | | 1 | N + 1 |
| | | | startPrbc | | | | | 1 | N + 2 |
| | | | numPrbc | | | | | 1 | N + 3 |
| | | | reMask [11:4] | | | | | 1 | N + 4 |
| reMask [3:0] | | | | numSymbol | | | | 1 | N + 5 |
| ef | | | ueId [14:8] | | | | | 1 | N + 6 |
| | | | ueId [7:0] | | | | | 1 | N + 7 |
| | | section extensions as indicated by "ef" | | | | | | var | N + 8 M |

The section type 6 message may include information elements (e.g., fields) described in Tables 11 to 13 below. The section type 6 message may include ueId, and the ueId included in the section type 6 message may be mapped to ueId of the section type 5 message.

TABLE 11

| | | | Section type 6 message | | | | | |
|---|---|---|---|---|---|---|---|---|
| 0 (MSB) | 1 | 2 | 3 | 4 | 5 | 6 | 7 (LSB) | Number of bytes | Octet |
| | | transport header | | | | | | 8 | 1 |
| data Direction | | payload Version | | | filterIndex | | | 1 | 9 |
| | | | frameId | | | | | 1 | 10 |
| | subframeId | | | | slotId | | | 1 | 11 |
| slotId | | | startSymbolid | | | | | 1 | 12 |
| | | | numberOfsetctions | | | | | 1 | 13 |
| | | | sectionType = 6 | | | | | 1 | 14 |
| | | | numberOfUEs | | | | | 1 | 15 |
| | | | reserved | | | | | 1 | 16 |

TABLE 12

| | | | Section type 6 message | | | | | |
|---|---|---|---|---|---|---|---|---|
| 0 (MSB) | 1 | 2 | 3 | 4 | 5 | 6 | 7 (LSB) | Number of bytes | Octet |
| ef | | | ueId [14:8] | | | | | 1 | 17 |
| | | | ueId [7:0] | | | | | 1 | 18 |
| | | | regularizationFactor | | | | | 2 | 19 |
| | reserved | | rb | symInc | | startPrbc | | 1 | 21 |
| | | | startPrbc | | | | | 1 | 22 |
| | | | numPrbc | | | | | 1 | 23 |
| ciIsample (first PRB, first antenna) | | | | | | | | var | 24 |
| ciQsample (first PRB, first antenna) | | | | | | | | var | |
| ciIsample (first PRB, second antenna) | | | | | | | | var | |
| ciQsample (first PRB, second antenna) | | | | | | | | var | |
| ... | | | | | | | | | |
| ciIsample (first PRB, last antenna) | | | | | | | | var | |
| ciQsample (first PRB, last antenna) | | | | | | | | var | |
| ... | | | | | | | | | |
| ciIsample (last PRB, last antenna) | | | | | | | | var | |
| ciQsample (last PRB, last antenna) | | | | | | | | var | |
| section extensions as indicated by "ef" | | | | | | | | var | |
| ... | | | | | | | | | |

TABLE 13

Section type 6 message

| 0 (MSB) | 1 | 2 | 3 | 4 | 5 | 6 | 7 (LSB) | Number of bytes | Octet |
|---|---|---|---|---|---|---|---|---|---|
| ef | | | | ueId [14:8] | | | | 1 | N |
| | | | | ueId [7:0] | | | | 1 | N + 1 |
| | | | | regularizationFactor | | | | 2 | N + 2 |
| reserved | | | rb | symInc | | startPrbc | | 1 | N + 4 |
| | | | | startPrbc | | | | 1 | N + 5 |
| | | | | numPrbc | | | | 1 | N + 6 |
| ciIsample (first PRB, first antenna) | | | | | | | | var | N + 7 |
| ciQsample (first PRB, first antenna) | | | | | | | | var | |
| ciIsample (first PRB, second antenna) | | | | | | | | var | |
| ciQsample (first PRB, second antenna) | | | | | | | | var | |
| ... | | | | | | | | | |
| ciIsample (first PRB, last antenna) | | | | | | | | var | |
| ciQsample (first PRB, last antenna) | | | | | | | | var | |
| ... | | | | | | | | | |
| ciIsample (last PRB, last antenna) | | | | | | | | var | |
| ciQsample (last PRB, last antenna) | | | | | | | | var | |
| section extensions as indicated by "ef" | | | | | | | | var | M |

The section type 6 message may be used to transmit channel information of each of the UEs. The section type 6 message may include IQ sample data for channel information. The ueId included in the section type 6 message may be mapped to resource allocation information for each of the UEs included in the section type 5 message. The channel information for the UE indicated by the section type 5 message may be transmitted by the section type 6 message. Accordingly, the O-RU may perform an appropriate beamforming operation for the UE indicated by the section type 5 message by using the channel information included in the section type 6 message. The section type 5 message including scheduling information of the terminal may be transmitted in every slot. The section type 6 message including channel information may not be transmitted in every slot.

The above-described section type 5 message and section type 6 message may not include information (frameStructure, timeOffset, cpLength, freqOffset, etc.) for a mixed numerology channel. That is, as in the case of the section type 1 message, parameters (e.g., frameStructure, timeOffset, cpLength, freqOffset, etc.) related to one pre-designated numerology may be used for one end point. Accordingly, when using the channel information transmission scheme, if a numerology different from the preconfigured numerology should be used, overhead may occur due to use of a plurality of end points or transmission of a plurality of control plane messages. Therefore, it may be inefficient to use the section type 5 message and the section type 6 message as they are for a mixed numerology channel. In order to solve the above-described problem, the section type 5 message and the section type 6 message may be extended to include numerology information.

Scheme 1

In order to solve the above-described problem, the existing section type 5 message and section type 6 message may be newly defined by being extended to include information on a mixed numerology channel. The message type newly defined by extending the section type 5 message and the section type 6 message may be used to support beamforming using the channel information transmission scheme (i.e., referred to as 'Scheme 1').

For example, a section type 8 message including information for a mixed numerology channel and the information elements of the existing section type 5 message may be defined by extending the existing section type 5 message.

The section type 8 message may include information elements described in Tables 14 to 16 below. That is, the section type 8 message may include frameStructure, timeOffset, cpLength, freqOffset, and the like. In order to process the message in units of 4 octets (i.e., 32 bits), a reserved field may be included in the section type 8 message. Since the newly-defined section type 8 message is used, the section type 8 message may not collide with the existing messages. Therefore, backward compatibility may be guaranteed.

TABLE 14

Section type 8 message

| 0 (MSB) | 1 | 2 | 3 | 4 | 5 | 6 | 7 (LSB) | Number of bytes | Octet |
|---|---|---|---|---|---|---|---|---|---|
| transport header | | | | | | | | 8 | 1 |
| data Direction | | payloadVersion | | | filterIndex | | | 1 | 9 |
| frameId | | | | | | | | 1 | 10 |
| subframeId | | | | | slotId | | | 1 | 11 |
| slotId | | | | startSymbolId | | | | 1 | 12 |
| numberOfsetctions | | | | | | | | 1 | 13 |
| sectionType = 8 | | | | | | | | 1 | 14 |
| time Offset | | | | | | | | 2 | 15 |
| frame Structure | | | | | | | | 1 | 17 |
| cpLength | | | | | | | | 2 | 18 |
| udCompHdr | | | | | | | | 1 | 20 |

TABLE 15

Section type 8 message

| 0 (MSB) | 1 | 2 | 3 | 4 | 5 | 6 | 7 (LSB) | Number of bytes | Octet |
|---|---|---|---|---|---|---|---|---|---|
| sectionId | | | | | | | | 1 | 21 |
| sectionId | | | rb | symInc | | startPrbc | | 1 | 22 |
| startPrbc | | | | | | | | 1 | 23 |
| numPrbc | | | | | | | | 1 | 24 |
| reMask[11:4] | | | | | | | | 1 | 25 |
| reMask[3:0] | | | | numSymbol | | | | 1 | 26 |
| ef | | | | ueId[14:8] | | | | 1 | 27 |
| ueId[7:0] | | | | | | | | 1 | 28 |
| freqOffset | | | | | | | | 3 | 29 |
| reserved | | | | | | | | 1 | 32 |
| section extensions as indicated by "ef" | | | | | | | | var | 33 |
| ... | | | | | | | | | |

TABLE 16

Section type 8 message

| 0 (MSB) | 1 | 2 | 3 | 4 | 5 | 6 | 7 (LSB) | Number of bytes | Octet |
|---|---|---|---|---|---|---|---|---|---|
| sectionId | | | | | | | | | N |
| sectionId | | | rb | symInc | | startPrbc | | 1 | N + 1 |
| startPrbc | | | | | | | | 1 | N + 2 |
| numPrbc | | | | | | | | 1 | N + 3 |
| reMask[11:4] | | | | | | | | 1 | N + 4 |
| reMask[3:0] | | | | numSymbol | | | | 1 | N + 5 |
| ef | | | | ueId[14:8] | | | | 1 | N + 6 |
| ueId[7:0] | | | | | | | | 1 | N + 7 |
| freqOffset | | | | | | | | 3 | N + 8 |
| reserved | | | | | | | | 1 | N + 11 |
| section extensions as indicated by "ef" | | | | | | | | var | N + 12 M |

For some data such as a PRACH, it may not be necessary to use the channel information transmission scheme. When a use case that a PRACH or the like is not transmitted through the section type 8 message is used, since the timeOffset field does not need to be used in the section type 8 message, the timeOffset field may be excluded from the section type 8 message. Alternatively, in the section type 8 message, the timeOffset field may be configured as a reserved field.

In addition, a section type 9 message including the information elements of the existing section type 6 message and information for a mixed numerology channel may be defined by extending the existing section type 6 message. The section type 9 message may include the information elements described in Tables 17 to 19 below. That is, the section type 9 message may include frameStructure, timeOffset, cpLength, freqOffset, and the like. In order to process the message in units of 4 octets (i.e., 32 bits), a reserved field may be included in the section type 9 message. Since the newly-defined section type 9 message is used, the section type 9 message may not collide with the existing messages. Therefore, backward compatibility may be guaranteed.

TABLE 17

Section type 9 message

| 0 (MSB) | 1 | 2 | 3 | 4 | 5 | 6 | 7 (LSB) | Number of bytes | Octet |
|---|---|---|---|---|---|---|---|---|---|
| transport header | | | | | | | | 8 | 1 |
| data Direction | payloadVersion | | | filterIndex | | | | 1 | 9 |
| frameId | | | | | | | | 1 | 10 |
| subframeId | | | | slotId | | | | 1 | 11 |
| slotId | | | startSymbolid | | | | | 1 | 12 |
| numberOfsetctions | | | | | | | | 1 | 13 |
| sectionType = 9 | | | | | | | | 1 | 14 |
| numberOfUEs | | | | | | | | 1 | 15 |
| time Offset | | | | | | | | 2 | 16 |
| frame Structure | | | | | | | | 1 | 18 |
| cpLength | | | | | | | | 2 | 19 |

TABLE 18

Section type 9 message

| 0 (MSB) | 1 | 2 | 3 | 4 | 5 | 6 | 7 (LSB) | Number of bytes | Octet |
|---|---|---|---|---|---|---|---|---|---|
| ef | | | ueId[14:8] | | | | | 1 | 21 |
| ueId[7:0] | | | | | | | | 1 | 22 |
| regularizationFactor | | | | | | | | 2 | 23 |
| reserved | | | rb | symInc | startPrbc | | | 1 | 25 |
| startPrbc | | | | | | | | 1 | 26 |
| numPrbc | | | | | | | | 1 | 27 |
| freqOffset | | | | | | | | 3 | 28 |
| ciIsample (first PRB, first antenna) | | | | | | | | var | 31 |
| ciQsample (first PRB, first antenna) | | | | | | | | var | |
| ciIsample (first PRB, second antenna) | | | | | | | | var | |
| ciQsample (first PRB, second antenna) | | | | | | | | var | |
| . . . | | | | | | | | | |
| ciIsample (first PRB, last antenna) | | | | | | | | var | |
| ciQsample (first PRB, last antenna) | | | | | | | | var | |
| . . . | | | | | | | | | |
| ciIsample (last PRB, last antenna) | | | | | | | | var | |
| ciQsample (last PRB, last antenna) | | | | | | | | var | |
| section extensions as indicated by "ef" | | | | | | | | var | |
| . . . | | | | | | | | | |

TABLE 19

Section type 9 message

| 0 (MSB) | 1 | 2 | 3 | 4 | 5 | 6 | 7 (LSB) | Number of bytes | Octet |
|---|---|---|---|---|---|---|---|---|---|
| ef | | | ueId[14:8] | | | | | 1 | N |
| ueId[7:0] | | | | | | | | 1 | N + 1 |
| regularizationFactor | | | | | | | | 2 | N + 2 |
| reserved | | | rb | symInc | startPrbc | | | 1 | N + 4 |
| startPrbc | | | | | | | | 1 | N + 5 |
| numPrbc | | | | | | | | 1 | N + 6 |
| freqOffset | | | | | | | | 3 | N + 7 |
| ciIsample (first PRB, first antenna) | | | | | | | | var | N + 10 |
| ciQsample (first PRB, first antenna) | | | | | | | | var | |
| ciIsample (first PRB, second antenna) | | | | | | | | var | |
| ciQsample (first PRB, second antenna) | | | | | | | | var | |
| . . . | | | | | | | | | |
| ciIsample (first PRB, last antenna) | | | | | | | | var | |
| ciQsample (first PRB, last antenna) | | | | | | | | var | |
| . . . | | | | | | | | | |
| ciIsample (last PRB, last antenna) | | | | | | | | var | |
| ciQsample (last PRB, last antenna) | | | | | | | | var | |
| section extensions as indicated by "ef" | | | | | | | | var | |
| | | | | | | | | | M |

For some data such as a PRACH, it may not be necessary to use the channel information transmission scheme. When a use case that a PRACH or the like is not transmitted through the section type 8 message is used, since the timeOffset field does not need to be used in the section type 9 message, the timeOffset field may be excluded from the section type 9 message. Alternatively, in the section type 9 message, the timeOffset field may be configured as a reserved field.

In addition, numerology-related information may be obtained by searching for an associated section of the section type 8 message through the ueId in the section type 9 message. Accordingly, in Table 17, a message format may be configured by deleting some or all of the frameStructure field, the timeOffset field, and the cpLength field. That is, the format of the section type 9 message may be configured such that only the freqOffset field among the numerology-related information is included for each ueId.

If resource allocation information such as startPrbc and numPrbc allocated to the ueId of the section type 8 message is always allocated identically to startPrbc and numPrbc associated with the same ueId of the section type 9 message, the above-described information may be excluded from the section type 9 message. That is, a format of the section type 9 message that does not include the above-described information may be configured.

The section type 8 message and the section type 9 message may be used for the channel information transmission scheme.

Figure 8:
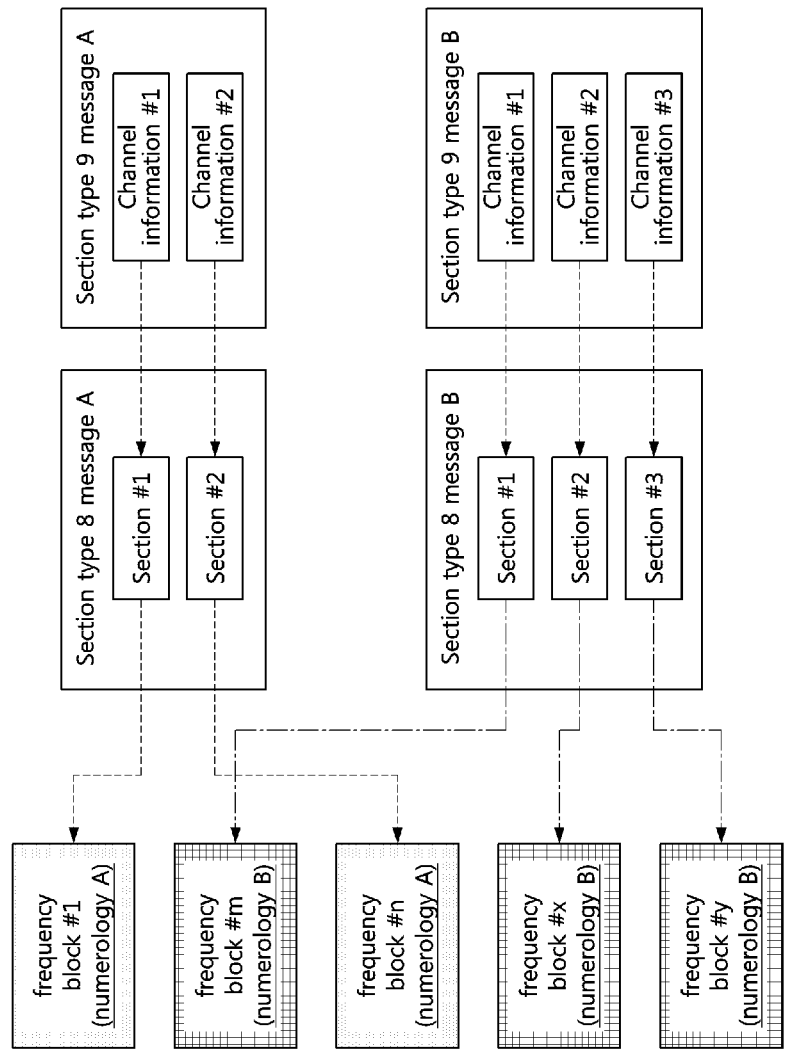
FIG. 8 is a conceptual diagram illustrating a first exemplary embodiment of a communication method using a section type 8 message and a section type 9 message in a communication system.

FIG. 8 is a conceptual diagram illustrating a first exemplary embodiment of a communication method using a section type 8 message and a section type 9 message in a communication system.

Referring to FIG. 8, a communication method using a section type 8 message and a section type 9 message may be performed by the O-DU and the O-RU constituting the base station. That is, a base station operation using a fronthaul including a beamforming operation may be performed using the section type 8 message and the section type 9 message. Two numerologies (e.g., numerologies A and B) may be used, two frequency blocks (e.g., frequency blocks #1 and #n) using the numerology A may be configured, and three frequency blocks (e.g., frequency blocks #m, #x, and #y) using the numerology B may be configured. The frequency block may be one PRB or a set of a plurality of PRBs. Each of n, m, x, and y may be a natural number.

In this case, a section type 8 message may be transmitted for each of the two numerologies. For example, a section type 8 message A may be used for the numerology A, and the section type 8 message A may include a section #1 indicating the frequency block #1 and a section #2 indicating the frequency block #n. That is, each of the sections #1 and #2 included in the section type 8 message A may indicate a different frequency offset (freqOffset). In addition, a section type 9 message A including channel information of each of the UEs indicated by the section type 8 message A, and including ueId, resource information, and numerology information, to which the corresponding channel information is applied, may be transmitted.

A section type 8 message B may be used for the numerology B, and the section type 8 message B may include a section #1 indicating the frequency block #m, a section #2 indicating the frequency block #x, and a section #3 indicating the frequency block #y. That is, each of the sections #1 to #3 included in the section type 8 message B may indicate a different frequency offset (freqOffset). In addition, a section type 9 message B including channel information of each of the UEs indicated by the section type 8 message B, and including ueId, resource information, and numerology information, to which the corresponding channel information is applied, may be transmitted.

One end point may support multiple frameStructure values (i.e., multiple numerologies), or may support only one frameStructure value (i.e., one numerology). Whether or not a specific end point supports multiple frameStructure values (i.e., multiple numerologies) may be informed by the O-RU to the O-DU through a parameter such as 'multiple-numerology-supported' in the management plane.

If a specific end point supports multiple frameStructure values (i.e., multiple numerologies), the section type 8 message A and the section type 8 message B may be transmitted using the one corresponding end point, and may use the same eAxC ID. In addition, the section type 9 message A and the section type 9 message B may also be transmitted using the one corresponding end point, and may use the same eAxC ID. That is, 'the section type 8 message A and the section type 8 message B' and 'the section type 9 message A and the section type 9 message B' may be transmitted using one end point, and may use the same eAxC ID.

If a specific end point supports only one frameStructure value (i.e., one numerology), one end point (one eAxC id) may be used for one frameStructure value (i.e., one numerology). The section type 8 message A and the section type 8 message B may be transmitted using different end points, and may use different eAxC IDs. In addition, the section type 9 message A and the section type 9 message B may be transmitted using different end points, and may also be transmitted using different eAxC IDs. That is, 'the section type 8 message A and the section type 8 message B' and the 'section type 9 message A and the section type 9 message B' may be transmitted using different end points for the respective frameStructure values (numerologies), and may use different eAxC IDs.

Scheme 1-1

In Scheme 1, the frameStructure field, timeOffset field, and cpLength field may be included once in the common header part of the section type 8 message and the section type 9 message, and only the freqOffset field may be included in each section. As a variation of the above format, a message may be configured such that not only the freqOffset field but also the frameStructure field, the timeOffset field, and the cpLength field are included for each section. The above-described scheme may be defined as 'Scheme 1-1'. When Scheme 1-1 is used, collisions with the existing messages may not occur. Therefore, backward compatibility may be guaranteed.

The section type 8 message may include one or more information elements described in Tables 20 to 22 below.

TABLE 20

| Section type 8 message | | | | | | | | | |
|---|---|---|---|---|---|---|---|---|---|
| 0 (MSB) | 1 | 2 | 3 | 4 | 5 | 6 | 7 (LSB) | Number of bytes | Octet |
| transport header | | | | | | | | 8 | 1 |
| dataDirection | payloadVersion | | | | filterIndex | | | 1 | 9 |
| frameId | | | | | | | | 1 | 10 |
| subframeId | | | | slotId | | | | 1 | 11 |
| slotId | | | startSymbolId | | | | | 1 | 12 |
| numberOfsetctions | | | | | | | | 1 | 13 |
| sectionType = 8 | | | | | | | | 1 | 14 |
| udCompHdr | | | | | | | | 1 | 15 |

TABLE 21

| Section type 8 message | | | | | | | | | |
|---|---|---|---|---|---|---|---|---|---|
| 0 (MSB) | 1 | 2 | 3 | 4 | 5 | 6 | 7 (LSB) | Number of bytes | Octet |
| sectionId | | | | | | | | 1 | 16 |
| sectionId | | rb | symInc | | startPrbc | | | 1 | 17 |
| startPrbc | | | | | | | | 1 | 18 |
| numPrbc | | | | | | | | 1 | 19 |
| reMask[11:4] | | | | | | | | 1 | 20 |
| reMask[3:0] | | | | numSymbol | | | | 1 | 21 |
| ef | | | ueId[14:8] | | | | | 1 | 22 |
| ueId[7:0] | | | | | | | | 1 | 23 |
| timeOffset | | | | | | | | 2 | 24 |
| frame Structure | | | | | | | | 1 | 26 |
| cpLength | | | | | | | | 2 | 27 |
| freqOffset | | | | | | | | 3 | 29 |
| section extensions as indicated by "ef" . . . | | | | | | | | var | 32 |

TABLE 22

| Section type 8 message | | | | | | | | | |
|---|---|---|---|---|---|---|---|---|---|
| 0 (MSB) | 1 | 2 | 3 | 4 | 5 | 6 | 7 (LSB) | Number of bytes | Octet |
| sectionId | | | | | | | | 1 | N |
| sectionId | | rb | symInc | | startPrbc | | | 1 | N + 1 |
| startPrbc | | | | | | | | 1 | N + 2 |
| numPrbc | | | | | | | | 1 | N + 3 |
| reMask[11:4] | | | | | | | | 1 | N + 4 |
| reMask[3:0] | | | | numSymbol | | | | 1 | N + 5 |
| ef | | | ueId[14:8] | | | | | 1 | N + 6 |
| ueId[7:0] | | | | | | | | 1 | N + 7 |
| timeOffset | | | | | | | | 2 | N + 8 |
| frame Structure | | | | | | | | 1 | N + 10 |
| cpLength | | | | | | | | 2 | N + 11 |
| freqOffset | | | | | | | | 3 | N + 13 |
| section extensions as indicated by "ef" | | | | | | | | var | N + 16 M |

For some data such as a PRACH, it may not be necessary to use the channel information transmission scheme. When a use case that a PRACH or the like is not transmitted through the section type 8 message is used, since the timeOffset field does not need to be used in the section type 8 message, the timeOffset field may be excluded from the section type 8 message. Alternatively, in the section type 8 message, the timeOffset field may be configured as a reserved field.

The section type 9 message may include one or more information elements described in Tables 23 to 25 below.

TABLE 23

| Section type 9 message | | | | | | | | | |
|---|---|---|---|---|---|---|---|---|---|
| 0 (MSB) | 1 | 2 | 3 | 4 | 5 | 6 | 7 (LSB) | Number of bytes | Octet |
| transport header | | | | | | | | 8 | 1 |
| dataDirection | payloadVersion | | | filterIndex | | | | 1 | 9 |
| frameId | | | | | | | | 1 | 10 |
| subframeId | | | | slotId | | | | 1 | 11 |
| slotId | | | startSymbolid | | | | | 1 | 12 |
| numberOfsetctions | | | | | | | | 1 | 13 |
| sectionType = 9 | | | | | | | | 1 | 14 |
| numberOfUEs | | | | | | | | 1 | 15 |

TABLE 24

| Section type 9 message | | | | | | | | | |
|---|---|---|---|---|---|---|---|---|---|
| 0 (MSB) | 1 | 2 | 3 | 4 | 5 | 6 | 7 (LSB) | Number of bytes | Octet |
| ef | ueId[14:8] | | | | | | | 1 | 16 |
| ueId[7:0] | | | | | | | | 1 | 17 |
| regularizationFactor | | | | | | | | 2 | 18 |
| reserved | | | rb | symInc | | startPrbc | | 1 | 20 |
| startPrbc | | | | | | | | 1 | 21 |
| numPrbc | | | | | | | | 1 | 22 |
| timeOffset | | | | | | | | 2 | 23 |
| frameStructure | | | | | | | | 1 | 25 |
| cpLength | | | | | | | | 2 | 26 |
| freqOffset | | | | | | | | 3 | 28 |
| ciIsample (first PRB, first antenna) | | | | | | | | var | 31 |
| ciQsample (first PRB, first antenna) | | | | | | | | var | |
| ciIsample (first PRB, second antenna) | | | | | | | | var | |
| ciQsample (first PRB, second antenna) | | | | | | | | var | |
| ... | | | | | | | | | |
| ciIsample (first PRB, last antenna) | | | | | | | | var | |
| ciQsample (first PRB, last antenna) | | | | | | | | var | |
| ... | | | | | | | | | |
| ciIsample (last PRB, last antenna) | | | | | | | | var | |
| ciQsample (last PRB, last antenna) | | | | | | | | var | |
| section extensions as indicated by "ef" | | | | | | | | var | |
| ... | | | | | | | | | |

TABLE 25

| Section type 9 message | | | | | | | | | |
|---|---|---|---|---|---|---|---|---|---|
| 0 (MSB) | 1 | 2 | 3 | 4 | 5 | 6 | 7 (LSB) | Number of bytes | Octet |
| ef | ueId[14:8] | | | | | | | 1 | N |
| ueId[7:0] | | | | | | | | 1 | N + 1 |
| regularizationFactor | | | | | | | | 2 | N + 2 |
| reserved | | | rb | symInc | | startPrbc | | 1 | N + 4 |
| startPrbc | | | | | | | | 1 | N + 5 |
| numPrbc | | | | | | | | 1 | N + 6 |
| time Offset | | | | | | | | 2 | N + 7 |
| frame Structure | | | | | | | | 1 | N + 9 |
| cpLength | | | | | | | | 2 | N + 10 |
| freqOffset | | | | | | | | 3 | N + 12 |
| ciIsample (first PRB, first antenna) | | | | | | | | var | N + 15 |
| ciQsample (first PRB, first antenna) | | | | | | | | var | |
| ciIsample (first PRB, second antenna) | | | | | | | | var | |
| ciQsample (first PRB, second antenna) | | | | | | | | var | |
| ... | | | | | | | | | |

TABLE 25-continued

| Section type 9 message | | | | | | | | | |
|---|---|---|---|---|---|---|---|---|---|
| 0 (MSB) | 1 | 2 | 3 | 4 | 5 | 6 | 7 (LSB) | Number of bytes | Octet |
| ciIsample (first PRB, last antenna) | | | | | | | | var | |
| ciQsample (first PRB, last antenna) | | | | | | | | var | |
| ... | | | | | | | | | |
| ciIsample (last PRB, last antenna) | | | | | | | | var | |
| ciQsample (last PRB, last antenna) | | | | | | | | var | |
| section extensions as indicated by "ef" | | | | | | | | var | |
| | | | | | | | | | M |

For some data such as a PRACH, it may not be necessary to use the channel information transmission scheme. When a use case that a PRACH or the like is not transmitted through the section type 8 message is used, since the timeOffset field does not need to be used also in the section type 9 message, the timeOffset field may be excluded from the section type 9 message. Alternatively, in the section type 9 message, the timeOffset field may be configured as a reserved field.

In addition, numerology-related information may be obtained by searching for an associated section of the section type 8 message through the ueId in the section type 9 message. Accordingly, in Tables 24 and 25, a message format may be configured by deleting some or all of the frameStructure field, the timeOffset field, and the cpLength field. That is, the format of the section type 9 message may be configured such that only the freqOffset field among the numerology-related information is included for each ueId.

If resource allocation information such as startPrbc and numPrbc allocated to the ueId of the section type 8 message is always allocated identically to startPrbc and numPrbc associated with the same ueId of the section type 9 message, the above-described information may be excluded from the section type 9 message. That is, a format of the section type 9 message that does not include the above-described information may be configured.

In Scheme 1-1, since the entire numerology-related information including frameStructure is included in each section, resources having different parameters of the frameStructure field, timeOffset field, and cpLength field as well as the freqOffset field may be represented with one control plane message. Accordingly, the number of transmitted control plane messages may be reduced. However, since the frameStructure field, the timeOffset field, and the cpLength field are repeatedly included in all sections, if the number of sections to be used increases, the size of the control plane message may increase compared to Scheme 1.

Figure 10:
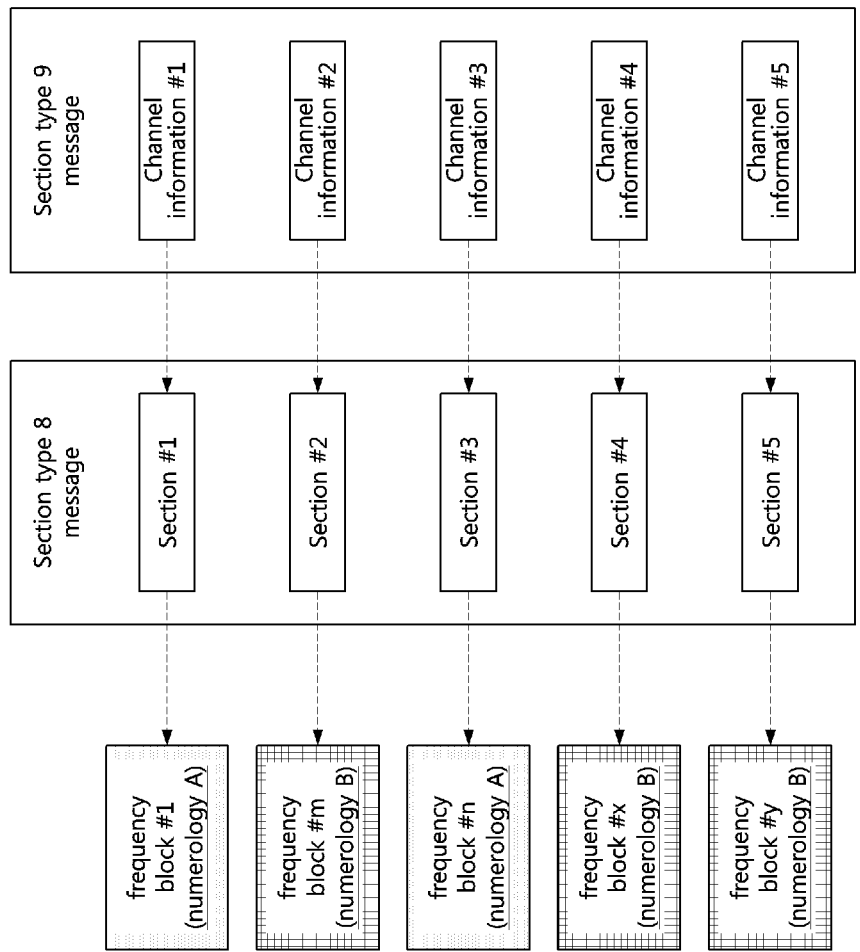
FIG. 10 is a conceptual diagram illustrating a second exemplary embodiment of a communication method using a section type 8 message and a section type 9 message in a communication system.

FIG. 10 is a conceptual diagram illustrating a second exemplary embodiment of a communication method using a section type 8 message and a section type 9 message in a communication system.

Referring to FIG. 10, a communication method using a section type 8 message and a section type 9 message may be performed by the O-DU and the O-RU constituting the base station. That is, a base station operation using a fronthaul including a beamforming operation may be performed using the section type 8 message and the section type 9 message. Two numerologies (e.g., numerologies A and B) may be used, two frequency blocks (e.g., frequency blocks #1 and #n) using the numerology A may be configured, and three frequency blocks (e.g., frequency blocks #m, #x, and #y) using the numerology B may be configured. The frequency block may be one PRB or a set of a plurality of PRBs. Each of n, m, x, and y may be a natural number.

In this case, one section type 8 message for two numerologies may be transmitted. For example, one section type 8 message may be used for the numerology A and the numerology B, and the section type 8 message may include a section #1 indicating the frequency block #1 using the numerology A and a section #3 indicating the frequency block #n using the numerology A. In addition, the section type 8 message may include a section #2 indicating the frequency block #m using the numerology B, a section #4 indicating the frequency block #x using the numerology B, and a section #5 indicating the frequency block #y using the numerology B. That is, each section of the section type 8 message may indicate different frameStructure, timeOffset, cpLength, and freqOffset. In addition, a section type 9 message including channel information of each of the UEs indicated by the section type 8 message, ueId and resource information to which the corresponding channel information is applied, numerology information (e.g., one or more of frameStructure, timeOffset, cpLength, freqOffset), and the like may be transmitted.

One end point may support multiple frameStructure values (i.e., multiple numerologies), or may support only one frameStructure value (i.e., one numerology). Whether or not a specific end point supports multiple frameStructure values (i.e., multiple numerologies) may be informed by the O-RU to the O-DU through a parameter such as 'multiple-numerology-supported' in the management plane.

If a specific end point supports multiple frameStructure values (i.e., multiple numerologies), the section type 8 message may be transmitted using the one corresponding end point, and may use one eAxC ID. In addition, the section type 9 message may also be transmitted using the one corresponding end point, and may use the same eAxC ID. That is, the section type 8 message and the section type 9 message may be transmitted using one end point, and may use the same eAxC ID.

If a specific end point supports only one frameStructure value (i.e., one numerology), one end point (one eAxC id) may be used for one frameStructure value (i.e., one numerology). If a specific end point supports one frameStructure value (i.e., one numerology), the section type 8 message and section type 9 message should be transmitted as a separate control plane message for each frameStructure, and the separated messages may be transmitted using different end points, and use different eAxC IDs. If a specific end point supports only one frameStructure value (that is, one numerology), the frameStructure value included in each section of one section type 8 message or section type 9 message may have to be the same. That is, the same frameStructure is used for each section in one message.

Scheme 1-2

In Scheme 1-1, the message may be configured such that not only the freqOffset field but also the frameStructure field, the timeOffset field, and the cpLength field are included for each section. The above-described information may be included in a section extension. A message may be configured in a manner that the section extension is added to each section of the existing section type 5 message and the section type 6 message. The above-described scheme may be defined as 'Scheme 1-2'. The section extension may be a mechanism that allows a field to be added to an arbitrary section of the existing control plane message type. A value of the of field of the section to which an additional field is to be added may be set to 1, and a section extension may be added immediately after the corresponding section. The section extension is a method in which an additional field can be easily inserted into the existing message, but there may be overhead due to a header of the section extension. This scheme also may not collide with the existing messages. Therefore, backward compatibility may be guaranteed.

Table 26 below may be an example of a section extension that can be added to the section type 5 message or the section type 6 message. The section extension defined in Table 26 below may be defined as 'section extension 15'.

TABLE 26

| Section extension 15 | | | | | | | | | |
|---|---|---|---|---|---|---|---|---|---|
| 0 (MSB) | 1 | 2 | 3 | 4 | 5 | 6 | 7 (LSB) | Number of bytes | Octet |
| ef | | | extType = 0 × 0F | | | | | 1 | N |
| | | | extLen | | | | | 1 | N + 1 |
| | | | timeOffset | | | | | 2 | N + 2 |
| | | | frame Structure | | | | | 1 | N + 4 |
| | | | cpLength | | | | | 2 | N + 5 |
| | | | freqOffset | | | | | 3 | N + 7 |
| | | | reserved | | | | | 2 | N + 10 |

The extension type (i.e., extType) may indicate the type of section extension. The of may indicate whether there is an additional section extension afterwards. The extension length (i.e., extLen) may indicate the length of the section extension.

For example, by setting ef=1 in the section type 5 message defined in Tables 9 and 10, and adding the section extension 15 immediately after the corresponding section, an extended section type 5 message in which numerology-related information is added to the corresponding section may be generated. In addition, by setting ef=1 in the section type 6 message defined in Tables 12 and 13, and adding the section extension 15 immediately after the corresponding section, an extended section type 6 message in which numerology-related information is added to the corresponding section may be generated. The information included in the extended section type 5 message and the extended section type 6 message may be the same as the information included in the section type 8 message and the section type 9 message according to Scheme 1-1.

When the extended section type 5 message or the extended section type 6 message generated in this manner is used, the extended section and the section of the existing section type 5 message or the existing section type 6 message may be used together. However, the size of the control plane message may increase due to the header of the section extension. In addition, it may not be possible to delete and/or change unnecessary fields in the existing section type, and thus, it may be difficult to optimize the message format.

For some data such as a PRACH, it may not be necessary to use the channel information transmission scheme. When a use case that a PRACH or the like is not transmitted through the extended section type 5 message is used, the timeOffset field does not need to be used in section extension 15 included in the above-described extended section type 5 message. Therefore, the timeOffset field may be excluded from the section type 5 message. Alternatively, in the section type 5 message, the timeOffset field may be configured as a reserved field. The section extension 15 defined in Table 27 below may not include the timeOffset field.

TABLE 27

| | | | | | | | | Number | |
|---|---|---|---|---|---|---|---|---|---|
| 0 (MSB) | 1 | 2 | 3 | 4 | 5 | 6 | 7 (LSB) | of bytes | Octet |
| ef | | | extType = 0 × 0F | | | | | 1 | N |
| | | | extLen | | | | | 1 | N + 1 |
| | | | frame Structure | | | | | 1 | N + 2 |
| | | | cpLength | | | | | 2 | N + 3 |
| | | | freqOffset | | | | | 3 | N + 5 |

For some data such as a PRACH, it may not be necessary to use the channel information transmission scheme. When a use case that a PRACH or the like is not transmitted through the extended section type 5 message is used, the timeOffset field does not need to be used also in the extended section type 6 message. Therefore, the timeOffset field may be excluded from the section type 6 message. Alternatively, in the section type 6 message, the timeOffset field may be configured as a reserved field.

In addition, by searching for an associated section of the extended section type 5 message through the ueId of the extended section type 6 message, numerology-related information may be obtained. Therefore, in the section extension 15 defined in Table 26 or 27, some or all of the frameStructure field, the timeOffset field, and the cpLength field may be deleted. Alternatively, in the section extension 15, some or all of the frameStructure field, the timeOffset field, and the cpLength field may be configured as reserved fields. The message format may be configured according to the above-described scheme. That is, the format of the extended section type 6 message may be configured to include only the freqOffset field among the numerology-related information for each ueId.

The section extension 15 defined in Table 28 below may not include the frameStructure field, the timeOffset field, and the cpLength field.

TABLE 28

| | | | | | | | | Number | |
|---|---|---|---|---|---|---|---|---|---|
| 0 (MSB) | 1 | 2 | 3 | 4 | 5 | 6 | 7 (LSB) | of bytes | Octet |
| ef | | | extType = 0 × 0F | | | | | 1 | N |
| | | | extLen | | | | | 1 | N + 1 |
| | | | reserved | | | | | 1 | N + 2 |
| | | | reserved | | | | | 2 | N + 3 |
| | | | freqOffset | | | | | 3 | N + 5 |

Figure 12:
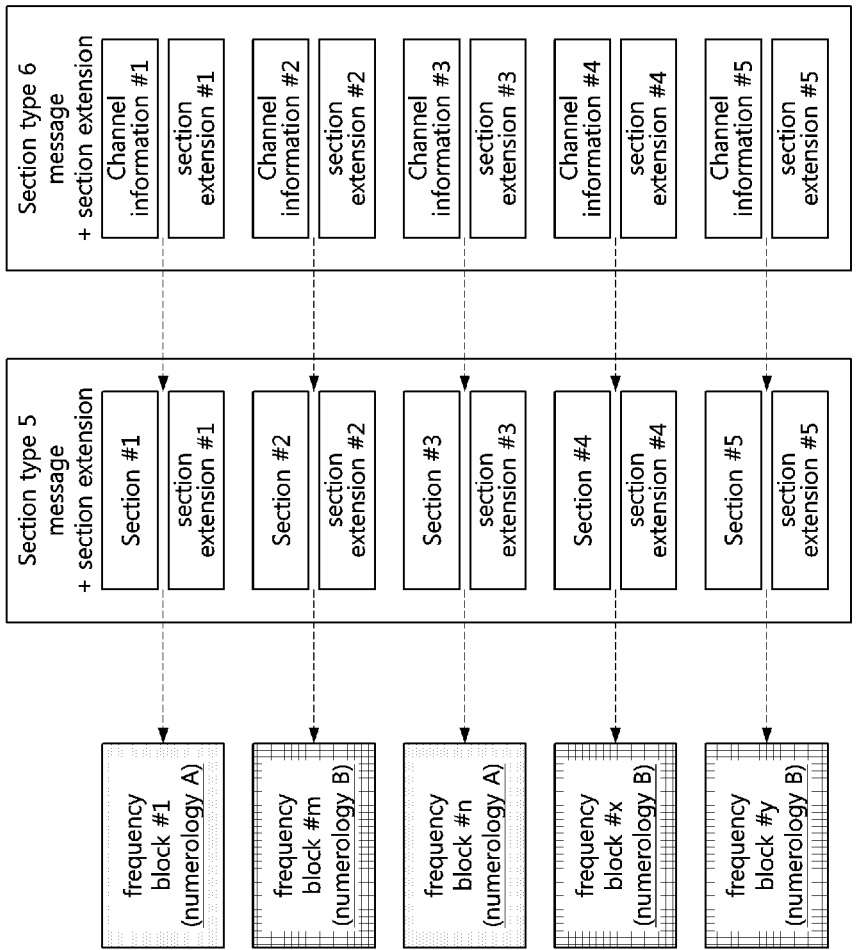
FIG. 12 is a conceptual diagram illustrating a first exemplary embodiment of a communication method using a section extension-applied section type 5 message and a section extension-applied section type 6 message in a communication system.

FIG. 12 is a conceptual diagram illustrating a first exemplary embodiment of a communication method using a section extension-applied section type 5 message and a section extension-applied section type 9 message in a communication system.

Referring to FIG. 12, a communication method using an extended section type 5 message and an extended section type 6 message may be performed by the O-DU and the O-RU constituting the base station. That is, a base station operation using a fronthaul including a beamforming operation may be performed using the extended section type 5 message and the extended section type 6 message. Two numerologies (e.g., numerologies A and B) may be used, two frequency blocks (e.g., frequency blocks #1 and #n) using the numerology A may be configured, and three frequency blocks (e.g., frequency blocks #m, #x, and #y) using the numerology B may be configured. The frequency block may be one PRB or a set of a plurality of PRBs. Each of n, m, x, and y may be a natural number.

In this case, one extended section type 5 message for two numerologies may be transmitted. For example, one extended section type 5 message may be used for the numerology A and the numerology B, and the extended section type 5 message may include a section #1 indicating the frequency block #1 using the numerology A and a section #3 indicating the frequency block #n using the numerology A. In addition, the extended section type 5 message may include a section #2 indicating the frequency block #m using the numerology B, a section #4 indicating the frequency block #x using the numerology B, and a section #5 indicating the frequency block #y using the numerology B. That is, each section of the extended section type 5 message may indicate different frameStructure, timeOffset, cpLength, and freqOffset. In addition, an extended section type 6 message including channel information of each of the UEs indicated by the extended section type 5 message, ueId and resource information to which the corresponding channel information is applied, numerology-related information (e.g., one or more of frameStructure, timeOffset, cpLength, freqOffset), and the like may be transmitted.

Scheme 1, Scheme 1-1, and Scheme 1-2 may be used in a combination. For example, the section type 8 message and the extended section type 6 message may be used together. Alternatively, the extended section type 5 message and the section type 9 message may be used together.

One end point may support multiple frameStructure values (i.e., multiple numerologies), or may support only one frameStructure value (i.e., one numerology). Whether or not a specific end point supports multiple frameStructure values (i.e., multiple numerologies) may be informed by the O-RU to the O-DU through a parameter such as 'multiple-numerology-supported' in the management plane.

If a specific end point supports multiple frameStructure values (i.e., multiple numerologies), the extended section type 5 message may be transmitted using the one corresponding end point, and may use one eAxC ID. In addition, the extended section type 6 message may also be transmitted using the one corresponding end point, and may use the same eAxC ID. That is, the extended section type 5 message and the extended section type 6 message may be transmitted using one end point, and may use the same eAxC ID.

If a specific end point supports only one frameStructure value (i.e., one numerology), one end point (one eAxC id) may be used for one frameStructure value (i.e., one numerology). If a specific end point supports one frameStructure value (i.e., one numerology), the extended section type 5 message and the extended section type 6 message should be transmitted as a separate control plane message for each frameStructure, and the separated messages may be transmitted using different end points, and use different eAxC IDs. If a specific end point supports only one frameStructure value (that is, one numerology), the frameStructure value included in each section of one extended section type 5 message or extended section type 6 message may have to be the same. That is, the same frameStructure is used for each section in one message.

Scheme 2

As a method for solving the above-described problem, a new section type message may be defined by extending the existing section type 5 message to include information on a mixed numerology channel. The message type newly defined by extending the section type 5 message and the existing section type 6 message may be used for the beamforming using the channel information transmission scheme (i.e., referred to as 'Scheme 2').

For example, by extending the existing section type 5 message, a section type 8 message including the information elements of the existing section type 5 message and information for a mixed numerology channel may be defined. The section type 8 message may include the information elements described in Tables 14 to 16. The section type 8 message in Scheme 2 may be the same as the section type 8 message in Scheme 1.

The section type 8 message may include numerology-related information (e.g., frameStructure, timeOffset, cpLength, freqOffset, etc.). For some data such as a PRACH, it may not be necessary to use the channel information transmission scheme. When a use case that at PRACH or the like is not transmitted through the section type 8 message is used, the timeOffset field does not need to be used in the section type 8 message. Therefore, the timeOffset field may be excluded from the section type 8 message. Alternatively, in the section type 8 message, the timeOffset field may be configured as a reserved field.

Numerology-related information (e.g., frameStructure, timeOffset, cpLength, freqOffset, etc.) for the section type 6 message may be indicated by a section (e.g., section having the same ueId) matched to the ueId (e.g., terminal ID) included in the section type 6 message among the sections included in the section type 8 message. For example, a section ID in the section type 8 message, which is matched to the ueId (i.e., terminal ID) of the section type 6 message, may be identified, the freqOffset for the corresponding section may be identified, and the remaining information (e.g., frameStructure, timeOffset, cpLength, etc.) for the mixed numerology channel may be identified through a common header included in the section type 8 message.

When Scheme 2 is used, only the section type 8 message may be newly extended and defined, and the existing section type 6 message may be used for the channel information transmission scheme. That is, since the numerology-related information (e.g., information for the mixed numerology channel) may be omitted in the signaling procedure of the channel information, the signaling overhead may be further reduced. Since the new section type 8 message and the existing section type 6 message are used, the section type 8 message and the section type 6 message may not collide with the existing messages. Therefore, backward compatibility may be guaranteed.

Figure 9:
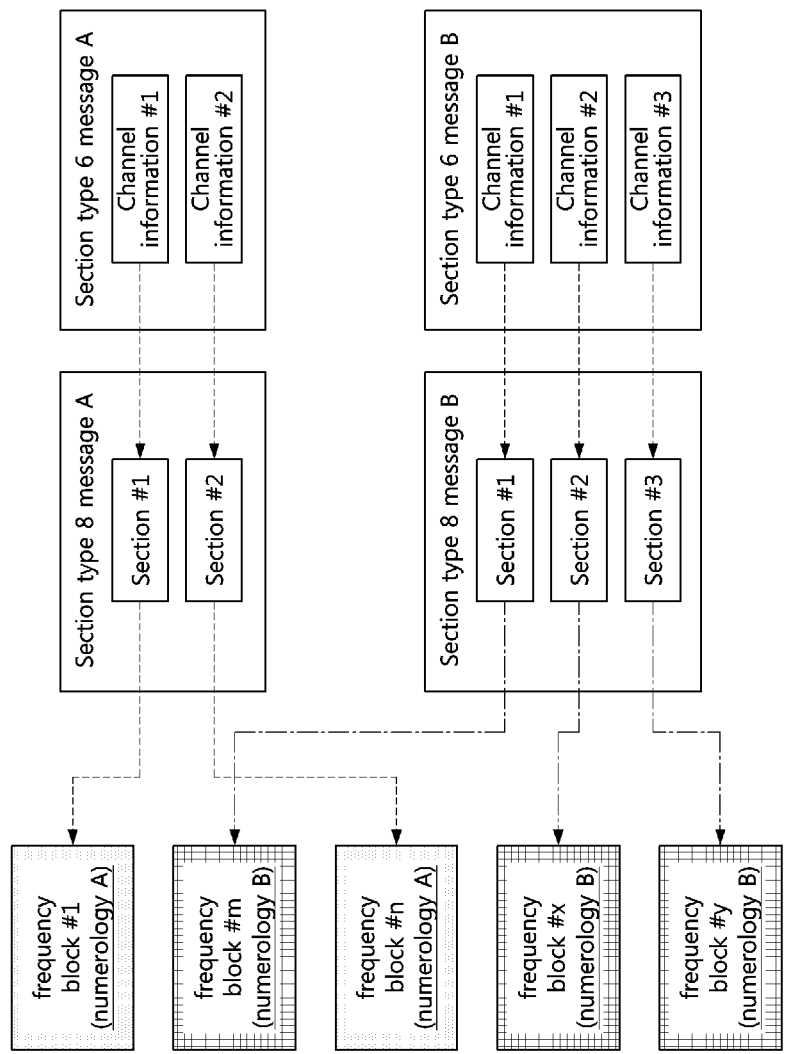
FIG. 9 is a conceptual diagram illustrating a first exemplary embodiment of a communication method using a section type 8 message and a section type 6 message in a communication system.

FIG. 9 is a conceptual diagram illustrating a first exemplary embodiment of a communication method using a section type 8 message and a section type 6 message in a communication system.

Referring to FIG. 9, a communication method using a section type 8 message and a section type 6 message may be performed by the O-DU and the O-RU constituting the base station. That is, a base station operation using a fronthaul including a beamforming operation may be performed using the section type 8 message and the section type 6 message. Two numerologies (e.g., numerologies A and B) may be used, two frequency blocks (e.g., frequency blocks #1 and #n) using the numerology A may be configured, and three frequency blocks (e.g., frequency blocks #m, #x, and #y) using the numerology B may be configured. The frequency block may be one PRB or a set of a plurality of PRBs. Each of n, m, x, and y may be a natural number.

In this case, a section type 8 message may be transmitted for each of the two numerologies. For example, a section type 8 message A may be used for the numerology A, and the section type 8 message A may include a section #1 indicating the frequency block #1 and a section #2 indicating the frequency block #n. That is, each of the sections #1 and #2 included in the section type 8 message A may indicate a different frequency offset (freqOffset). In addition, a section type 6 message A including channel information of each of the UEs indicated by the section type 8 message A, and including ueId and resource information, to which the corresponding channel information is applied, may be transmitted. The section type 6 message A may not include numerology-related information (e.g., frameStructure, timeOffset, cpLength, freqOffset). The numerology-related information may be identified through a section ID matched to the terminal ID (e.g., UE ID) of the section type 6 message A among sections included in the section type 8 message A.

A section type 8 message B may be used for the numerology B, and the section type 8 message B may include a section #1 indicating the frequency block #m, a section #2 indicating the frequency block #x, and a section #3 indicating the frequency block #y. That is, each of the sections #1 to #3 included in the section type 8 message B may indicate a different frequency offset (freqOffset). In addition, a section type 6 message B including channel information of each of the UEs indicated by the section type 8 message B, and including ueId and resource information, to which the corresponding channel information is applied, may be transmitted. The section type 6 message B may not include numerology-related information (e.g., frameStructure, timeOffset, cpLength, freqOffset). The numerology-related information may be identified through a section ID matched to the terminal ID (e.g., UE ID) of the section type 6 message B among sections included in the section type 8 message B.

One end point may support multiple frameStructure values (i.e., multiple numerologies), or may support only one frameStructure value (i.e., one numerology). Whether or not a specific end point supports multiple frameStructure values (i.e., multiple numerologies) may be informed by the O-RU to the O-DU through a parameter such as 'multiple-numerology-supported' in the management plane.

If a specific end point supports multiple frameStructure values (i.e., multiple numerologies), the section type 8 message A and the section type 8 message B may be transmitted using the one corresponding end point, and may use the same eAxC ID. In addition, the section type 6 message A and the section type 6 message B may also be transmitted using the one corresponding end point, and may use the same eAxC ID. That is, 'the section type 8 message A and the section type 8 message B' and 'the section type 6 message A and the section type 6 message B' may be transmitted using one end point, and may use the same eAxC ID.

If a specific end point supports only one frameStructure value (i.e., one numerology), one end point (one eAxC id) may be used for one frameStructure value (i.e., one numerology). The section type 8 message A and the section type 8 message B may be transmitted using different end points, and use different eAxC IDs. In addition, the section type 6 message A and the section type 6 message B may be transmitted using different end points, and may also be transmitted using different eAxC IDs. That is, the section type 8 message A and the section type 8 message B' and the section type 6 message A and the section type 6 message B' may be transmitted using different end points for the respective frameStructure values (numerologies), and may use different eAxC IDs.

Scheme 2-1

In Scheme 2, the frameStructure field, timeOffset field, and cpLength field may be included only once in the common header part of the section type 8 message, and only the freqOffset field may be included for each section. As a variation of the above-described message format, a message may be configured such that not only the freqOffset field but also the frameStructure field, timeOffset field, and cpLength field are included for each section. (That is, referred to as 'Scheme 2-1'). When Scheme 2-1 is used, collisions with the existing messages may not occur. Therefore, backward compatibility may be guaranteed.

The section type 8 message may include one or more information elements described in Tables 20 to 22. The section type 8 message in Scheme 2-1 may be the same as the section type 8 message in Scheme 1-1.

The section type 8 message may include numerology-related information (e.g., frameStructure, timeOffset, cpLength, freqOffset, etc.). For some data such as a PRACH, it may not be necessary to use the channel information transmission scheme. When a use case that at PRACH or the like is not transmitted through the section type 8 message is used, the timeOffset field does not need to be used in the section type 8 message. Therefore, the timeOffset field may be excluded from the section type 8 message. Alternatively, in the section type 8 message, the timeOffset field may be configured as a reserved field.

Numerology-related information (e.g., frameStructure, timeOffset, cpLength, freqOffset, etc.) for the section type 6 message may be indicated by a section (e.g., section having the same ueId) matched to the ueId (e.g., terminal ID) included in the section type 6 message among the sections included in the section type 8 message. For example, a section ID in the section type 8 message, which is matched to the ueId (i.e., terminal ID) of the section type 6 message, may be identified. Since the corresponding section of the section type 8 message includes the entire numerology-related information, the information (e.g., frameStructure, timeOffset, cpLength, freqOffset, etc.) for the mixed numerology channel for the corresponding section may be identified.

When Scheme 2-1 is used, only the section type 8 message may be newly extended and defined, and the existing section type 6 message may be used for the channel information transmission scheme. That is, since the numerology-related information (e.g., information for the mixed numerology channel) may be omitted in the signaling procedure of the channel information, the signaling overhead may be further reduced. Since the new section type 8 message and the existing section type 6 message are used, the section type 8 message and the section type 6 message may not collide with the existing messages. Therefore, backward compatibility may be guaranteed.

In Scheme 2-1, since the entire numerology-related information including frameStructure is included in each section, resources having different parameters of the frameStructure field, timeOffset field, and cpLength field as well as the freqOffset field may be represented with one control plane message. Accordingly, the number of transmitted control plane messages may be reduced. However, since the frameStructure field, the timeOffset field, and the cpLength field are repeatedly included in all sections, if the number of sections to be used increases, the size of the control plane message may increase compared to Scheme 2.

Figure 11:
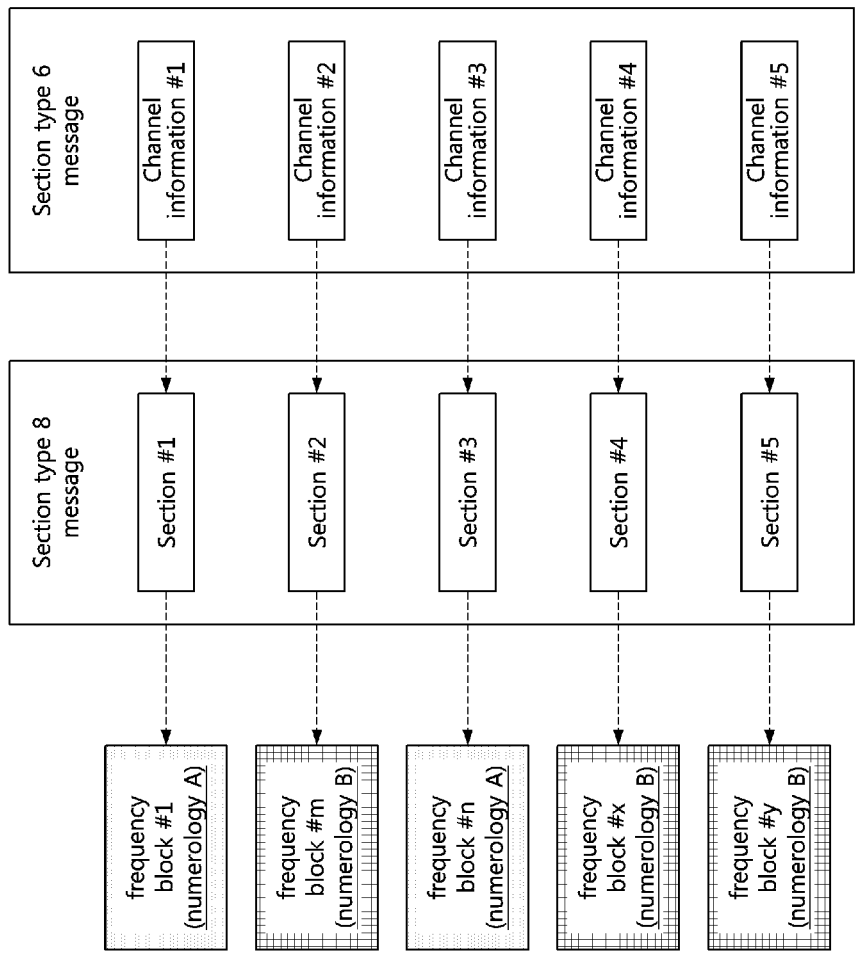
FIG. 11 is a conceptual diagram illustrating a second exemplary embodiment of a communication method using a section type 8 message and a section type 6 message in a communication system.

FIG. 11 is a conceptual diagram illustrating a second exemplary embodiment of a communication method using a section type 8 message and a section type 6 message in a communication system.

Referring to FIG. 11, a communication method using a section type 8 message and a section type 6 message may be performed by the O-DU and the O-RU constituting the base station. That is, a base station operation using a fronthaul including a beamforming operation may be performed using the section type 8 message and the section type 6 message. Two numerologies (e.g., numerologies A and B) may be used, two frequency blocks (e.g., frequency blocks #1 and #n) using the numerology A may be configured, and three frequency blocks (e.g., frequency blocks #m, #x, and #y) using the numerology B may be configured. The frequency block may be one PRB or a set of a plurality of PRBs. Each of n, m, x, and y may be a natural number.

In this case, one section type 8 message for two numerologies may be transmitted. For example, one section type 8 message may be used for the numerology A and the numerology B, and the section type 8 message may include a section #1 indicating the frequency block #1 using the numerology A and a section #3 indicating the frequency block #n using the numerology A. In addition, the section type 8 message may include a section #2 indicating the frequency block #m using the numerology B, a section #4 indicating the frequency block #x using the numerology B, and a section #5 indicating the frequency block #y using the numerology B. That is, each section of the section type 8 message may indicate different frameStructure, timeOffset, cpLength, and freqOffset. In addition, a section type 6 message including channel information of each of the UEs indicated by the section type 8 message, and ueId and resource information, to which the corresponding channel information is applied, may be transmitted. The section type 6 message may not include numerology-related information (e.g., frameStructure, timeOffset, cpLength, freqOffset). The numerology-related information may be identified through a section ID matched to the terminal ID (e.g., UE ID) of the section type 6 message among sections included in the section type 8 message.

One end point may support multiple frameStructure values (i.e., multiple numerologies), or may support only one frameStructure value (i.e., one numerology). Whether or not a specific end point supports multiple frameStructure values (i.e., multiple numerologies) may be informed by the O-RU to the O-DU through a parameter such as 'multiple-numerology-supported' in the management plane.

If a specific end point supports multiple frameStructure values (i.e., multiple numerologies), the section type 8 message may be transmitted using the one corresponding end point, and may use one eAxC ID. In addition, the section type 6 message may also be transmitted using the one corresponding end point, and may use the same eAxC ID. That is, the section type 8 message and the section type 6 message may be transmitted using one end point, and may use the same eAxC ID.

If a specific end point supports only one frameStructure value (i.e., one numerology), one end point (one eAxC ID) may be used for one frameStructure value (i.e., one numerology). If a specific end point supports one frameStructure value (i.e., one numerology), the section type 8 message and the section type 6 message associated with the section type 8 message should be transmitted as a separate control plane message for each frameStructure, and the separated messages may be transmitted using different end points, and use different eAxC IDs. If a specific end point supports only one frameStructure value (that is, one numerology), the frameStructure value included in each section of one section type 8 message may have to be the same. That is, the same frameStructure is used for each section in one message.

Scheme 2-2

When Scheme 2-1 is used, the message may be configured such that not only the freqOffset field but also the frameStructure field, the timeOffset field, and the cpLength field are included for each section. The above-described information may be included in a section extension. A message may be configured in a manner that the section extension is added to each section of the existing section type 5 message, and the corresponding message may be used together with the existing non-extended section type 6 message (That is, referred to as 'Scheme 2-2'). The section extension is a method in which an additional field can be easily inserted into the existing message, but there may be overhead due to a header of the section extension. This scheme also may not collide with the existing messages. Therefore, backward compatibility may be guaranteed.

Table 26 shows an example of a section extension that can be added to the section type 5 message. The section extension may be defined as 'section extension 15'. For example, by setting ef=1 in the section type 5 message defined in Tables 9 and 10, and adding the section extension 15 immediately after the corresponding section, the extended section type 5 message in which numerology-related information is added to the corresponding section may be generated.

The content included in the extended section type 5 message may be the same as the content included in the section type 8 message according to Scheme 2-1. The section type 5 message extended in Scheme 2-2 may be the same as the section type 5 message extended in Scheme 1-2.

According to the extended section type 5 message generated in the above-described manner, the existing section of the section type 5 message and the extended section may be used together. However, the size of the control plane message may increase due to the header of the section extension. In addition, it may not be possible to delete and/or change unnecessary fields in the existing section type, and thus, it may be difficult to optimize the message format.

For some data such as a PRACH, it may not be necessary to use the channel information transmission scheme. When a use case in which a PRACH or the like is not transmitted through the extended section type 5 message is used, the timeOffset field does not need to be used in the section extension 15 included in the above-described extended section type 5 message. Therefore, the timeOffset field may be excluded from the section type 5 message. Alternatively, in the section type 5 message, the timeOffset field may be configured as a reserved field. The section extension 15 defined in Table 27 may not include the timeOffset field.

The numerology-related information (e.g., frameStructure, timeOffset, cpLength, freqOffset, etc.) for the section type 6 message may be indicated by a section (e.g., section including the same ueId) matched to the ueId (e.g., terminal ID) included in the section type 6 message among the sections included in the extended section type 5 message. For example, the section ID of the extended section type 5 message matched to the ueId (terminal ID) of the section type 6 message may be identified. Since entire numerology-related information is included in the extended section associated with the section of the extended section type 5 message, information (e.g., frameStructure, timeOffset, cpLength, freqOffset, etc.) for a mixed numerology channel for the corresponding section may be identified.

When Scheme 2-2 is used, only the section type 5 message may be newly extended and defined, and the existing section type 6 message may be used for the channel information transmission scheme. That is, since the numerology-related information (e.g., information for the mixed numerology channel) may be omitted in the signaling procedure of the channel information, the signaling overhead may be further reduced. Since the section type 5 message extended using the section extension and the existing section type 6 message are used, the extended section type 5 message and the section type 6 message may not collide with the existing messages. Therefore, backward compatibility may be guaranteed.

Figure 13:
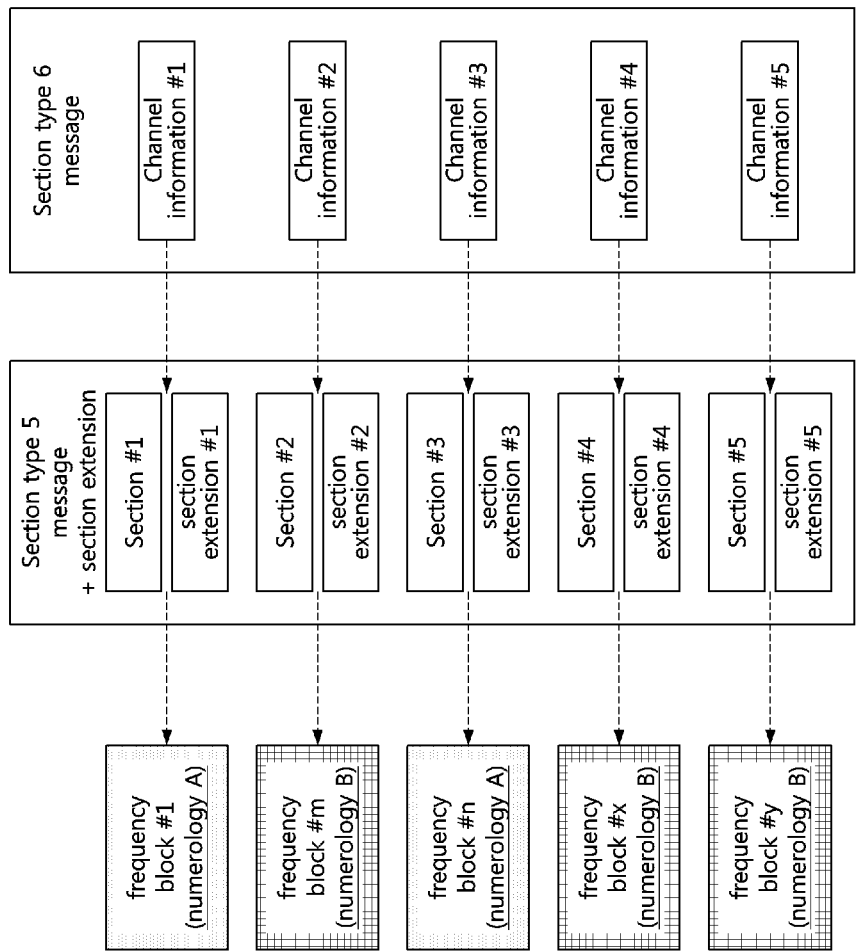
FIG. 13 is a conceptual diagram illustrating a second exemplary embodiment of a communication method using a section extension-applied section type 5 message and a section type 6 message in a communication system.

FIG. 13 is a conceptual diagram illustrating a second exemplary embodiment of a communication method using a section extension-applied section type 5 message and a section type 6 message in a communication system.

Referring to FIG. 13, a communication method using an extended section type 5 message and a section type 6 message may be performed by the O-DU and the O-RU constituting the base station. That is, a base station operation using a fronthaul including a beamforming operation may be performed using the extended section type 5 message and the section type 6 message. Two numerologies (e.g., numerologies A and B) may be used, two frequency blocks (e.g., frequency blocks #1 and #n) using the numerology A may be configured, and three frequency blocks (e.g., frequency blocks #m, #x, and #y) using the numerology B may be configured. The frequency block may be one PRB or a set of a plurality of PRBs. Each of n, m, x, and y may be a natural number.

In this case, one extended section type 5 message for two numerologies may be transmitted. For example, one extended section type 5 message may be used for the numerology A and the numerology B, and the extended section type 5 message may include a section #1 indicating the frequency block #1 using the numerology A and a section #3 indicating the frequency block #n using the numerology A. In addition, the extended section type 5 message may include a section #2 indicating the frequency block #m using the numerology B, a section #4 indicating the frequency block #x using the numerology B, and a section #5 indicating the frequency block #y using the numerology B. That is, each section of the extended section type 5 message may indicate different frameStructure, timeOffset, cpLength, and freqOffset. In addition, a section type 6 message including channel information of each of the UEs indicated by the extended section type 5 message, and ueId and resource information, to which the corresponding channel information is applied, may be transmitted. The section type 6 message may not include numerology-related information (e.g., frameStructure, timeOffset, cpLength, freqOffset). The numerology-related information may be identified through a section ID matched to the terminal ID (e.g., UE ID) of the section type 6 message among sections included in the extended section type 5 message.

One end point may support multiple frameStructure values (i.e., multiple numerologies), or may support only one frameStructure value (i.e., one numerology). Whether or not a specific end point supports multiple frameStructure values (i.e., multiple numerologies) may be informed by the O-RU to the O-DU through a parameter such as 'multiple-numerology-supported' in the management plane.

If a specific end point supports multiple frameStructure values (i.e., multiple numerologies), the extended section type 5 message may be transmitted using the one corresponding end point, and may use one eAxC ID. In addition, the section type 6 message may also be transmitted using the one corresponding end point, and may use the same eAxC ID. That is, the extended section type 5 message and the section type 6 message may be transmitted using one end point, and may use the same eAxC ID.

If a specific end point supports only one frameStructure value (i.e., one numerology), one end point (one eAxC ID) may be used for one frameStructure value (i.e., one numerology). If a specific end point supports one frameStructure value (i.e., one numerology), the extended section type 5 message and the section type 6 message associated with the extended section type 5 message should be transmitted as a separate control plane message for each frameStructure, and the separated messages may be transmitted using different end points, and may use different eAxC IDs. If a specific end point supports only one frameStructure value (that is, one numerology), the frameStructure value included in each section of one extended section type 5 message may have to be the same. That is, the same frameStructure is used for each section in one message.

When the above-described various types of channel information transmission beamforming scheme are used, in order not to apply beamforming to a specific resource, it may be indicated that beamforming is not applied to the specific resource by indicating the resource to which the beamforming is not applied as a section in the existing section type 5 message, extended section type 5 message, or section type 8 message and setting the ueId of the corresponding section to a specific value (e.g., all bits are set to 0 or 1). When the beamforming is configured not to be applied to the specific section using the ueId using the specific value, the channel information for the ueId may not be included in the existing section type 6 message, extended section type 6 message, or section type 9 message, so that the overhead of the control plane message may be reduced.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first communication node in a communication system supporting an open-radio access network (O-RAN) fronthaul interface, the operation method comprising:

transmitting a first section type 8 message including first numerology-related information; and transmitting a first section type 9 message including channel information of each of one or more second communication nodes indicated by the first section type 8 message and the first numerology related information, wherein the first numerology-related information includes frame structure information, cyclic prefix (CP) length information, and frequency offset information.

2. The operation method according to claim 1, further comprising:

transmitting a second section type 8 message including second numerology-related information other than the first numerology-related information; and transmitting a second section type 9 message including channel information of each of one or more third communication nodes indicated by the second section type 8 message and the second numerology-related information.

3. The operation method according to claim 1, wherein the first numerology-related information includes further time offset information.

4. The operation method according to claim 2, wherein each of the first section type 8 message and the second section type 8 message includes a plurality of sections, and the plurality of sections indicate different frequency offsets.

5. The operation method according to claim 2, wherein channel information of the second communication node indicated by an identifier included in each of sections included in the first section type 8 message is indicated by a section mapped to the identifier of the second communication node among sections included in the first section type 9 message, and channel information of the third communication node indicated by an identifier included in each of sections included in the second section type 8 message is indicated by a section mapped to the identifier of the third communication node among sections included in the second section type 9 message.

6. The operation method according to claim 2, wherein the first section type 8 message includes information included in the section type 5 message for the O-RAN fronthaul interface and the first numerology-related information, and the second section type 8 message includes the information included in the section type 5 message and the second numerology-related information.

7. The operation method according to claim 2, wherein each of the first section type 9 message and the second section type 9 message is generated based on a section type 6 message for the O-RAN fronthaul interface.

8. The operation method according to claim 2, wherein the first section type 8 message, the second section type 8 message, the first section type 9 message, and the second section type 9 message are used for a channel-information-based-beamforming operation.

9. The operation method according to claim 2, wherein the first communication node is an O-RAN distributed unit (O-DU), each of the one or more second communication nodes and the one or more third communication nodes is an O-RAN radio unit (O-RU), and communication between the O-DU and the O-RU is performed using the O-RAN fronthaul interface.

10. An operation method of a first communication node in a communication system supporting an open-radio access network (O-RAN) fronthaul interface, the operation method comprising:

transmitting a first section type 8 message including first numerology-related information; and transmitting a first section type 6 message including channel information of each of one or more second communication nodes indicated by the first section type 8 message, wherein the first numerology-related information includes frame structure information, cyclic prefix (CP) length information, and frequency offset information.

11. The operation method according to claim 10, further comprising:

transmitting a second section type 8 message including second numerology-related information other than the first numerology-related information; and transmitting a second section type 6 message including channel information of each of one or more third communication nodes indicated by the second section type 8 message.

12. The operation method according to claim 10, wherein of the first numerology-related information includes further time offset information.

13. The operation method according to claim 11, wherein each of the first section type 8 message and the second section type 8 message includes a plurality of sections, and the plurality of sections indicate different frequency offsets.

14. The operation method according to claim 11, wherein channel information of the second communication node indicated by an identifier included in each of sections included in the first section type 8 message is indicated by a section mapped to the identifier of the second communication node among sections included in the first section type 6 message, and channel information of the third communication node indicated by an identifier included in each of sections included in the second section type 8 message is indicated by a section mapped to the identifier of the third communication node among sections included in the second section type 6 message.

15. The operation method according to claim 11, wherein the first section type 8 message includes information included in the section type 5 message for the O-RAN fronthaul interface and the first numerology-related information, and the second section type 8 message includes the information included in the section type 5 message and the second numerology-related information.

16. The operation method according to claim 11, wherein the first communication node is an O-RAN distributed unit (O-DU), each of the one or more second communication nodes and the one or more third communication nodes is an O-RAN radio unit (O-RU), and communication between the O-DU and the O-RU is performed using the O-RAN fronthaul interface.

* * * * *